(12) United States Patent
Schmeichel et al.

(10) Patent No.: US 10,086,682 B2
(45) Date of Patent: Oct. 2, 2018

(54) ROLL-UP TARP APPARATUS HAVING TELESCOPING ARM

(71) Applicant: Agri-Cover, Inc., Jamestown, ND (US)

(72) Inventors: Charles M. Schmeichel, Jamestown, ND (US); Christopher D. Althoff, Jamestown, ND (US); Shawn J. Wock, Buchanan, ND (US)

(73) Assignee: Agri-Cover, Inc., Jamestown, ND (US)

( * ) Notice: Subject to any disclaimer, the term of this patent is extended or adjusted under 35 U.S.C. 154(b) by 30 days.

(21) Appl. No.: 15/247,148

(22) Filed: Aug. 25, 2016

(65) Prior Publication Data

US 2017/0057332 A1    Mar. 2, 2017

Related U.S. Application Data

(60) Provisional application No. 62/212,461, filed on Aug. 31, 2015.

(51) Int. Cl.
*B60J 7/08* (2006.01)
*B60P 7/04* (2006.01)

(52) U.S. Cl.
CPC ............... *B60J 7/085* (2013.01); *B60P 7/04* (2013.01)

(58) Field of Classification Search
CPC ............... B60J 7/08; B60J 7/085; B60P 7/04
USPC ................................ 296/98, 100.01, 100.12
See application file for complete search history.

(56) References Cited

U.S. PATENT DOCUMENTS

| | | | |
|---|---|---|---|
| 102,642 A | 5/1870 | Yenne | |
| 856,159 A | 6/1907 | Keller | |
| 989,069 A | 4/1911 | Siewert | |
| 1,199,766 A | 10/1916 | Dewstow | |
| 1,322,326 A | 11/1919 | Miller | |
| 1,526,045 A | 2/1925 | Brown | |
| 1,558,114 A | 10/1925 | Morrison | |
| 1,612,446 A | 12/1926 | Larson | |

(Continued)

FOREIGN PATENT DOCUMENTS

| AT | 112325 B | 2/1929 |
|---|---|---|
| CA | 1 243 062 A1 | 10/1988 |

(Continued)

OTHER PUBLICATIONS

Agri-Cover, Inc., Roltec™ Replacement conversion spring arms installation instructions P/N 90321, Nov. 2014, ACI, Jamestown, North Dakota.

(Continued)

*Primary Examiner* — Jason S Daniels
(74) *Attorney, Agent, or Firm* — Moore & Hansen, PLLC; Robert C. Freed

(57) ABSTRACT

A roll-up tarp apparatus for attachment to an open-top truck trailer, with a flexible tarp that rolls onto and unrolls from a roll bar as the roll bar rolls across the trailer. The roll bar is connected to the trailer by two telescoping arms which each have a lower portion that slides within an upper portion to telescope and adjust the length of the telescoping arms as the roll bar rolls across the trailer. The telescoping arms each have two bearings, which are on opposite sides of the telescoping arm and which are separated along the length of the telescoping arm, so that when forces are applied to the telescoping arm during use, the bearing surfaces aid in sliding the lower portion within the upper portion.

65 Claims, 20 Drawing Sheets

(56) References Cited

U.S. PATENT DOCUMENTS

| | | |
|---|---|---|
| 1,643,281 A | 9/1927 | Baumann et al. |
| 1,786,048 A | 12/1930 | Williams |
| 1,844,809 A | 2/1932 | Spaugh |
| 1,941,214 A | 12/1933 | Kusterle |
| 2,595,597 A | 5/1952 | Morseth |
| 2,743,132 A | 4/1956 | Zahn |
| 2,766,008 A | 10/1956 | Hurd |
| 2,771,319 A | 11/1956 | Renquist |
| 2,797,124 A | 6/1957 | Hauptli |
| 2,906,323 A | 9/1959 | Macy |
| 2,958,083 A | 11/1960 | Shook et al. |
| 2,976,082 A | 3/1961 | Dahlman |
| 3,146,824 A | 9/1964 | Veilleux |
| 3,184,261 A | 5/1965 | Young |
| 3,384,413 A | 5/1968 | Sargent |
| 3,467,431 A | 9/1969 | Turcotte |
| 3,494,658 A | 2/1970 | Maes |
| 3,498,666 A | 3/1970 | Harrawood |
| 3,515,428 A | 6/1970 | Killion |
| 3,549,198 A | 12/1970 | Cappello |
| 3,622,193 A | 11/1971 | Schmidt |
| 3,656,802 A | 4/1972 | White |
| 3,667,802 A | 6/1972 | Love |
| 3,759,568 A | 9/1973 | Unruh |
| 3,768,540 A | 10/1973 | McSwain |
| 3,768,595 A | 10/1973 | Kelly, Jr. |
| 3,774,958 A | 11/1973 | Thorpe |
| 3,785,694 A | 1/1974 | Sargent |
| 3,819,082 A | 6/1974 | Rosenvold |
| 3,820,840 A | 6/1974 | Forsberg |
| 3,829,154 A | 8/1974 | Becknell |
| 3,833,255 A | 9/1974 | Logue |
| 3,854,770 A | 12/1974 | Grise et al. |
| 3,861,737 A | 1/1975 | Kirkbride |
| 3,868,142 A | 2/1975 | Bachand et al. |
| 3,910,629 A | 10/1975 | Woodard |
| 3,913,969 A | 10/1975 | Hoch |
| 3,924,889 A | 12/1975 | Gogush |
| 3,942,830 A | 3/1976 | Woodard |
| 3,957,068 A | 5/1976 | Cox |
| 3,964,781 A | 6/1976 | Fenton |
| 3,975,047 A | 8/1976 | McClellan |
| 3,986,749 A | 10/1976 | Hull et al. |
| 4,003,301 A | 1/1977 | Norton |
| 4,012,021 A | 3/1977 | Duceppe |
| 4,014,590 A | 3/1977 | Schulz, Jr. |
| 4,023,857 A | 5/1977 | Killion |
| 4,030,780 A | 6/1977 | Petretti |
| 4,032,186 A | 6/1977 | Pickering et al. |
| 4,046,416 A | 9/1977 | Penner |
| 4,050,734 A | 9/1977 | Richard |
| 4,054,011 A | 10/1977 | Ensink et al. |
| 4,067,603 A | 1/1978 | Fenton |
| 4,082,347 A | 4/1978 | Petretti |
| 4,088,234 A | 5/1978 | Smith |
| 4,095,838 A | 6/1978 | Beeler |
| 4,095,840 A | 6/1978 | Woodard |
| 4,098,477 A | 7/1978 | Perez |
| 4,126,351 A | 11/1978 | Peteretti |
| 4,129,331 A | 12/1978 | Lawson et al. |
| 4,140,339 A | 2/1979 | Fredin |
| 4,157,202 A | 6/1979 | Bachand |
| 4,162,100 A | 7/1979 | Muscillo |
| 4,172,614 A | 10/1979 | Guido, Jr. |
| 4,189,178 A | 2/1980 | Cramaro |
| 4,200,330 A | 4/1980 | Scott |
| 4,201,254 A | 5/1980 | Fehric |
| 4,212,492 A | 7/1980 | Johnsen |
| 4,218,087 A | 8/1980 | Neville |
| 4,223,941 A | 9/1980 | Janzen et al. |
| 4,225,175 A | 9/1980 | Fredin |
| 4,230,359 A | 10/1980 | Smith |
| 4,234,224 A | 11/1980 | Rosenvold |
| 4,248,475 A | 2/1981 | Johnsen |
| 4,269,443 A | 5/1981 | Farmer |
| 4,272,119 A | 6/1981 | Adams |
| 4,277,220 A | 7/1981 | Wiley |
| 4,281,872 A | 8/1981 | Biancale |
| 4,302,043 A | 11/1981 | Dimmer et al. |
| 4,302,044 A | 11/1981 | Sims |
| 4,341,416 A | 7/1982 | Richard |
| 4,380,350 A | 4/1983 | Block |
| 4,416,485 A | 11/1983 | Long |
| RE31,746 E | 11/1984 | Dimmer et al. |
| 4,484,777 A | 11/1984 | Michel |
| 4,505,512 A | 3/1985 | Schmeichel et al. |
| 4,516,802 A | 5/1985 | Compton |
| 4,518,193 A | 5/1985 | Heider et al. |
| 4,529,098 A | 7/1985 | Heider et al. |
| 4,544,196 A | 10/1985 | Schmeichel et al. |
| 4,583,777 A | 4/1986 | Myburgh |
| 4,585,267 A | 4/1986 | Friesen |
| 4,627,658 A | 12/1986 | Vold et al. |
| 4,657,062 A | 4/1987 | Tuerk |
| 4,659,134 A | 4/1987 | Johnson |
| 4,668,007 A | 5/1987 | Sloan |
| 4,673,208 A | 6/1987 | Tsukamoto |
| 4,691,957 A | 9/1987 | Ellingson |
| 4,700,985 A | 10/1987 | Whitehead |
| 4,703,971 A | 11/1987 | Schmeichel et al. |
| 4,715,089 A | 12/1987 | Schema |
| 4,725,090 A | 2/1988 | Weaver |
| 4,740,029 A | 4/1988 | Tuerk |
| 4,757,854 A | 7/1988 | Rippberger |
| 4,801,171 A | 1/1989 | Weaver |
| 4,823,707 A | 4/1989 | Salsbury et al. |
| 4,834,445 A | 5/1989 | Odegaard |
| 4,854,630 A | 8/1989 | Biancale |
| 4,858,984 A | 8/1989 | Weaver |
| 4,874,196 A | 10/1989 | Goldstein et al. |
| 4,893,864 A | 1/1990 | Bailey |
| 4,915,439 A | 4/1990 | Cramaro |
| 4,923,240 A | 5/1990 | Swanson |
| 4,944,551 A | 7/1990 | Hardy, Jr. |
| 4,948,193 A | 8/1990 | Weaver |
| 4,981,411 A | 1/1991 | Ramsey |
| 4,995,663 A | 2/1991 | Weaver et al. |
| 5,002,328 A | 3/1991 | Michel |
| 5,004,032 A | 4/1991 | Pedersen |
| 5,007,672 A | 4/1991 | Koch |
| 5,026,109 A | 6/1991 | Merlot, Jr. |
| 5,031,955 A | 7/1991 | Searfoss |
| 5,050,923 A | 9/1991 | Petelka |
| 5,058,652 A | 10/1991 | Wheatley et al. |
| 5,058,956 A | 10/1991 | Godwin, Sr. |
| 5,064,240 A | 11/1991 | Kuss et al. |
| 5,067,767 A | 11/1991 | Biancale |
| 5,076,338 A | 12/1991 | Schmeichel et al. |
| 5,080,422 A | 1/1992 | DeMonte et al. |
| 5,080,423 A | 1/1992 | Merlot et al. |
| 5,102,182 A | 4/1992 | Haddad, Jr. |
| 5,112,097 A | 5/1992 | Turner, Jr. |
| 5,129,698 A | 7/1992 | Cohrs et al. |
| 5,145,230 A | 9/1992 | Biancale |
| 5,152,575 A | 10/1992 | DeMonte et al. |
| 5,174,353 A | 12/1992 | Schmeichel et al. |
| 5,179,991 A | 1/1993 | Haddad, Jr. |
| 5,180,203 A | 1/1993 | Goudy |
| 5,190,341 A | 3/1993 | Simard |
| 5,203,055 A | 4/1993 | Broadwater, Sr. |
| 5,211,440 A | 5/1993 | Cramaro |
| 5,211,441 A | 5/1993 | Barkus et al. |
| 5,218,743 A | 6/1993 | Miller |
| 5,238,287 A | 8/1993 | Haddad, Jr. |
| 5,238,359 A | 8/1993 | Chen |
| 5,240,303 A | 8/1993 | Hageman |
| 5,240,304 A | 8/1993 | Cramaro et al. |
| 5,253,914 A | 10/1993 | Biancale |
| 5,275,459 A | 1/1994 | Haddad, Jr. |
| 5,281,074 A | 1/1994 | Mashuda |
| 5,288,123 A | 2/1994 | Dimmer |
| 5,303,972 A | 4/1994 | Heider et al. |
| 5,328,228 A | 7/1994 | Klassen |
| 5,380,058 A | 1/1995 | Short et al. |

(56) References Cited

U.S. PATENT DOCUMENTS

| | | |
|---|---|---|
| 5,385,377 A | 1/1995 | Girard |
| 5,388,882 A | 2/1995 | Russell et al. |
| 5,429,408 A | 7/1995 | Henning et al. |
| 5,435,627 A | 7/1995 | Fleming |
| 5,462,102 A | 10/1995 | Searfoss |
| 5,466,030 A | 11/1995 | Harris et al. |
| 5,474,354 A | 12/1995 | Beale |
| 5,482,347 A | 1/1996 | Clarys et al. |
| 5,487,584 A | 1/1996 | Jaspersen |
| 5,491,021 A | 2/1996 | Tolliver et al. |
| 5,498,057 A | 3/1996 | Reina et al. |
| 5,498,066 A | 3/1996 | Cuthbertson et al. |
| 5,524,953 A | 6/1996 | Shaer |
| 5,538,313 A | 7/1996 | Henning |
| 5,542,734 A | 8/1996 | Burcett et al. |
| 5,549,347 A | 8/1996 | Anderson |
| 5,573,295 A | 11/1996 | Haddad, Jr. |
| 5,658,037 A | 8/1997 | Evans et al. |
| 5,664,824 A | 9/1997 | Stephens et al. |
| 5,692,793 A | 12/1997 | Wilson et al. |
| 5,713,712 A | 2/1998 | McIntyre |
| 5,743,700 A | 4/1998 | Wood, Jr. et al. |
| 5,752,735 A | 5/1998 | Fleming et al. |
| 5,762,002 A | 6/1998 | Dahlin et al. |
| 5,765,901 A | 6/1998 | Wilkens |
| 5,775,765 A | 7/1998 | Kintz |
| 5,803,528 A | 9/1998 | Haddad, Jr. |
| 5,823,067 A | 10/1998 | Clarys et al. |
| 5,823,604 A | 10/1998 | Chenowth |
| 5,829,819 A | 11/1998 | Searfoss |
| RE36,135 E | 3/1999 | O'Brian |
| 5,887,937 A | 3/1999 | Searfoss |
| 5,924,758 A | 7/1999 | Dimmer et al. |
| 5,938,270 A | 8/1999 | Swanson et al. |
| 5,944,374 A | 8/1999 | Searfoss |
| 5,957,523 A | 9/1999 | Haddad, Jr. |
| 5,964,236 A | 10/1999 | Berke |
| D427,135 S | 6/2000 | Searfoss |
| 6,135,534 A | 10/2000 | Bodecker |
| 6,142,553 A | 11/2000 | Bodecker |
| 6,199,935 B1 | 3/2001 | Waltz et al. |
| 6,206,449 B1 | 3/2001 | Searfoss |
| 6,237,985 B1 | 5/2001 | O'Brian |
| 6,257,646 B1 | 7/2001 | Searfoss |
| 6,322,041 B1 | 11/2001 | Schmeichel |
| 6,513,856 B1 | 2/2003 | Swanson et al. |
| 6,527,331 B2 | 2/2003 | Searfoss |
| 6,637,800 B2 | 10/2003 | Henning |
| 6,641,199 B1 | 11/2003 | Hicks |
| 6,659,531 B2 | 12/2003 | Searfoss |
| 6,685,251 B2 | 2/2004 | Dumas |
| 6,715,817 B2 | 4/2004 | Nolan et al. |
| 6,783,168 B2 | 8/2004 | Searfoss |
| 6,808,220 B2 | 10/2004 | Wheatley |
| 6,857,682 B2 | 2/2005 | Eggers et al. |
| 6,886,879 B2 | 5/2005 | Nolan et al. |
| 6,916,060 B2 | 7/2005 | Searfoss |
| 6,979,043 B2 | 12/2005 | Leischner et al. |
| 7,032,950 B2 | 4/2006 | Eggers et al. |
| 7,188,887 B1 | 3/2007 | Schmeichel |
| 7,195,304 B1 | 3/2007 | Schmeichel |
| 7,246,838 B2 | 7/2007 | Searfoss |
| 7,275,780 B2 | 10/2007 | Boyd et al. |
| 7,841,642 B2 | 11/2010 | Schaefer |
| 8,226,150 B1 | 7/2012 | Schmeichel et al. |
| 8,496,283 B1 | 7/2013 | Schmeichel et al. |
| 8,534,742 B2 | 9/2013 | Schmeichel et al. |
| 8,857,885 B2 | 10/2014 | Schmeichel et al. |
| 8,985,669 B2 | 3/2015 | Schmeichel |
| 9,039,065 B2 | 5/2015 | Schmeichel |
| 9,254,776 B2 | 2/2016 | Schmeichel |
| 9,272,610 B2 | 3/2016 | Schmeichel et al. |
| 9,421,900 B2 | 8/2016 | Schmeichel et al. |
| 9,511,703 B2 | 12/2016 | Schmeichel et al. |
| 2002/0021018 A1 | 2/2002 | Royer |
| 2002/0084672 A1 | 7/2002 | Searfoss |
| 2003/0052505 A1 | 3/2003 | Searfoss |
| 2003/0215319 A1* | 11/2003 | Nurse .................. B66C 23/701 414/685 |
| 2004/0245800 A1 | 12/2004 | Wheatley |
| 2005/0057068 A1 | 3/2005 | Searfoss |
| 2005/0062314 A1 | 3/2005 | Searfoss |
| 2008/0042466 A1 | 2/2008 | Searfoss |
| 2010/0164246 A1 | 7/2010 | Schaefer |
| 2011/0227363 A1 | 9/2011 | Smith et al. |
| 2013/0313855 A1* | 11/2013 | Schmeichel ............ B60J 7/085 296/98 |

FOREIGN PATENT DOCUMENTS

| | | |
|---|---|---|
| DE | 33 40 876 A1 | 5/1985 |
| GB | 2 041 839 A | 9/1980 |
| GB | 1 587 813 A | 4/1981 |
| NO | 381008 | 3/1983 |

OTHER PUBLICATIONS

Shur-Co., Rear Aluminum Cap W/Flap & Cable Return, Instruction Manual, Sep. 16, 2003, 2pgs, www.shurco.com, Shur-Co., Yankton, South Dakota.

Agri-Cover, Rocker Switch Instructions for Hardware Kit # 40604, Instruction Manual, Mar. 13, 2007, 2pgs, ACI, Jamestown, North Dakota.

Agri-Cover, Inc., SRT-21™ Spool Roll Tarp Features, web site details for agricultural trailer tarp systems, 2008, 6 pgs, www.agricover.com/index.php/products/, ACI, Jamestown, North Dakota.

Agri-Cover, Inc., SRT™ Spool Roll Tarp Hand and Electric Owner's Manual, Owner's Manual, 2006, 23pgs, ACI, Jamestown, North Dakota.

Agri-Cover, Inc., EZ-Loc Electric Roll-Up Tarp Tarp Kit Instructions, Instruction Manual, 2006, 7pgs, ACI, Jamestown, North Dakota.

Agri-Cover, Inc., Agri-Cover® EZ-Loc® Roll-Up Tarp for Farm Truck, Grain Cart, and Semi-Trailer Boxes Owner's Manual, Owner's Manual, 2007, ACI, Jamestown, North Dakota.

Agri-Cover, Inc., Agri-Cover® SRT-2™ Agri-Cover® Electric SRT-2™ Spool Roll Tarp Hand and Electric Owner's Manual, Owner's Manual, 2008, ACI Jamestown, North Dakota.

Agri-Cover, Inc., Agri-Cover® ES-Loc® Roll-Up Tarp EZ-Loc® Hand and Electric Installation Instructions and Owner's Manual, Instructions and Owner's Manual, 2008, 25pgs, Jamestown, North Dakota.

Agri-Cover, Inc., ACI™ Agri-Cover, Inc 2008 Roll Tarp Price Guide Agri-Cover® SRT-2™ Spool Roll Tarp Agri-Cover® EZ-Loc® Roll-Up Tarp, Price Guide, 2008, 23pgs, ACI, Jamestown, North Dakota.

Shur-Co., Replacement Parts: Roll Tarp—Electric Swing Arm Shur-Lok®: General Parts, replacement part order form, published online at least as early as May 5, 2009, www.ShooShurco.com, 6pgs, Shur-Co., Yankton, South Dakota.

United States Patent and Trademark Office, Prosecution History of U.S. Appl. No. 12/463,049, filed May 8, 2009, Applicant Charles M. Schmeichel et al.

United States Patent and Trademark Office, Prosecution History of U.S. Appl. No. 13/531,767, filed Jun. 25, 2012, Applicant Charles M. Schmeichel et al.

United States Patent and Trademark Office, Prosecution History of U.S. Appl. No. 13/966,755, filed Aug. 14, 2013, Applicant Charles M. Schmeichel et al.

United States Patent and Trademark Office, Prosecution History of U.S. Appl. No. 14/693,044, filed Apr. 22, 2015, Applicant Charles M. Schmeichel et al., up to Aug. 31, 2016, less IDS documents submitted presently.

\* cited by examiner

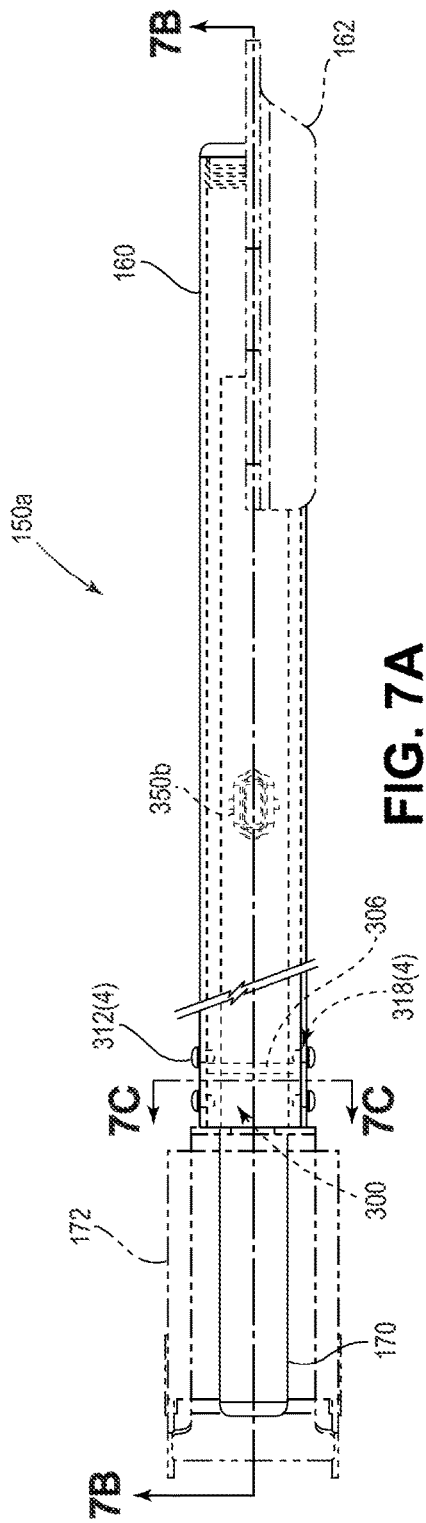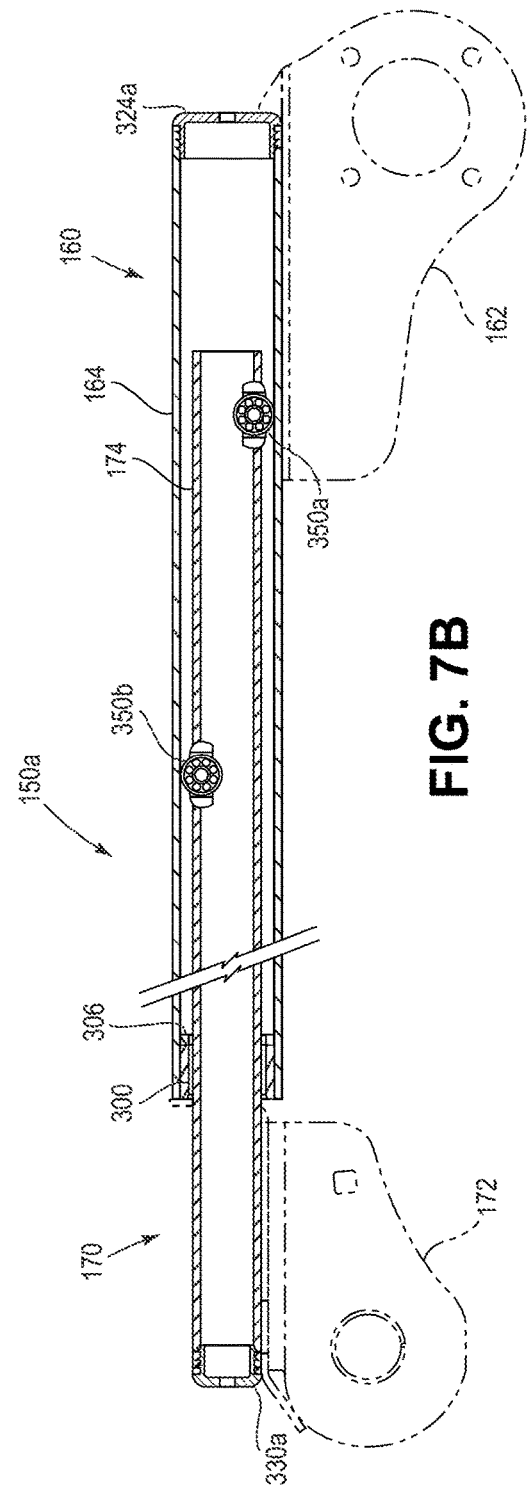
FIG. 7A
FIG. 7B

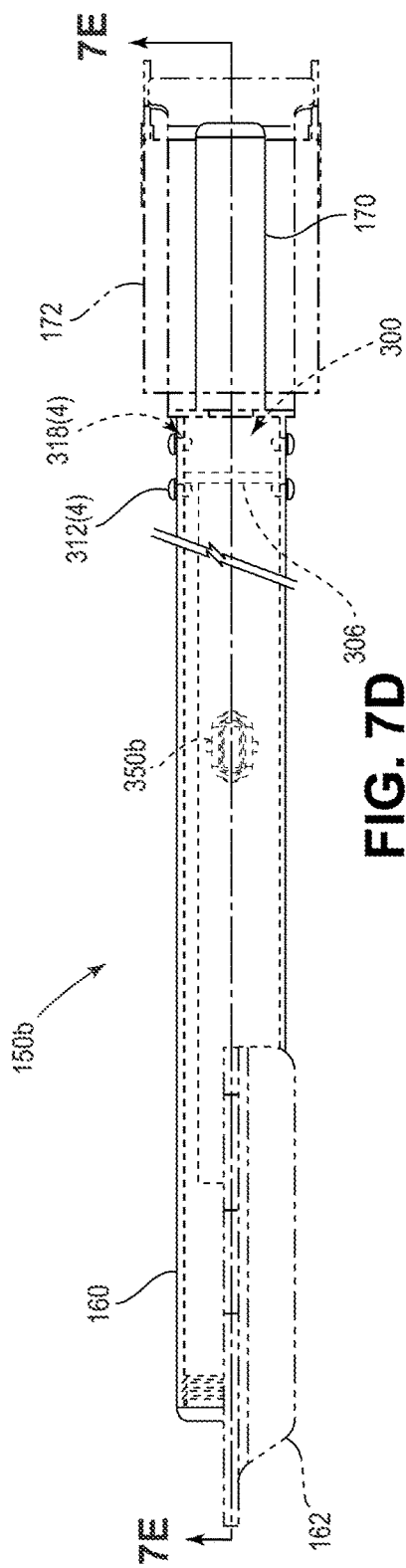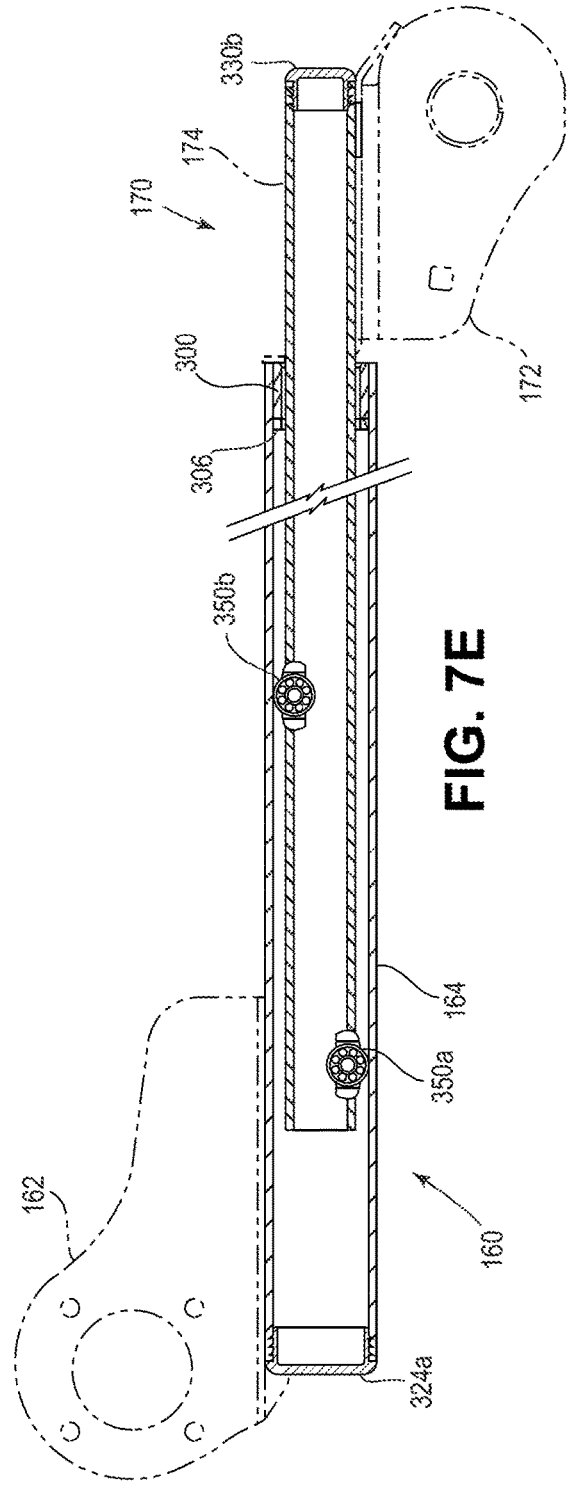
FIG. 7D
FIG. 7E

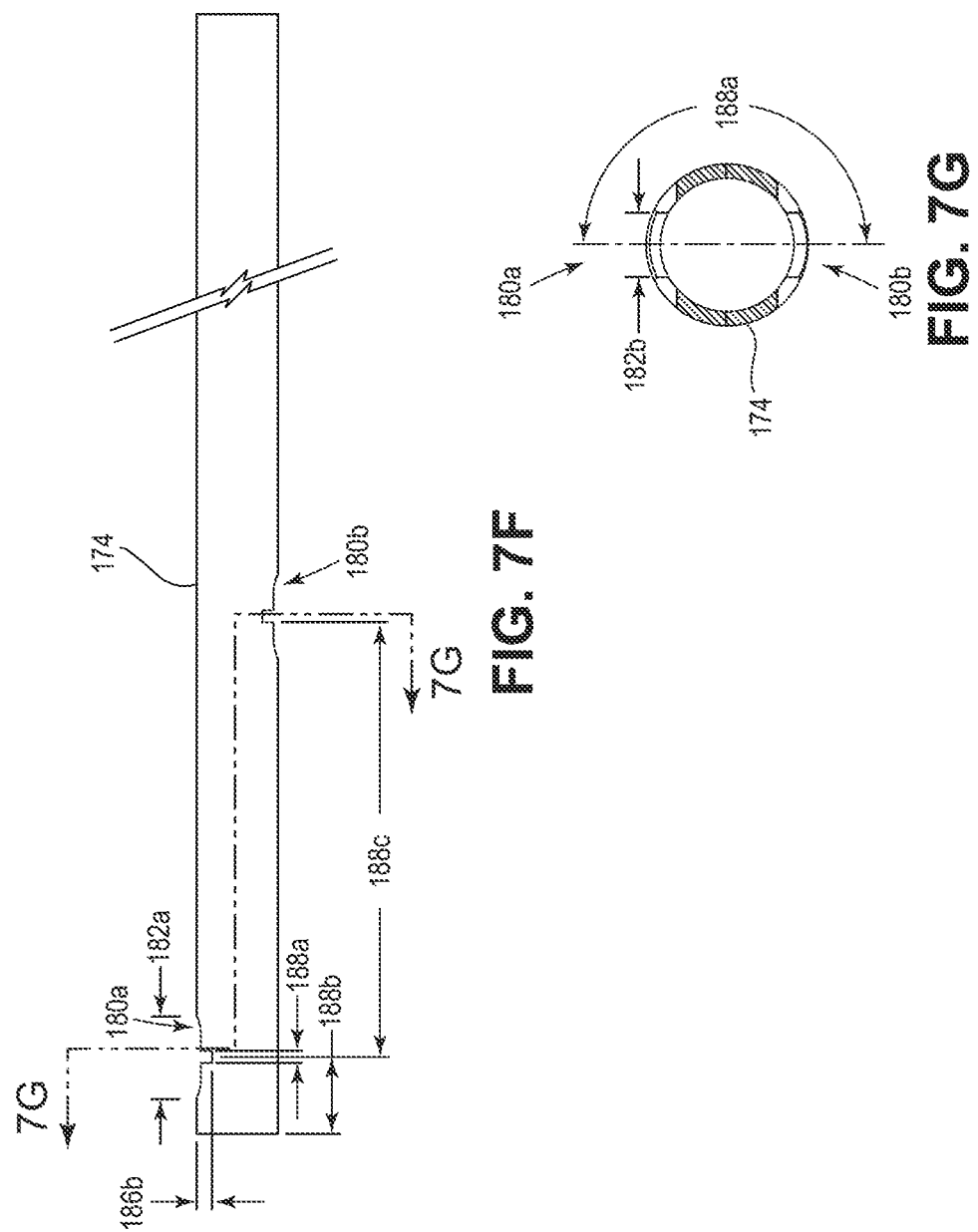

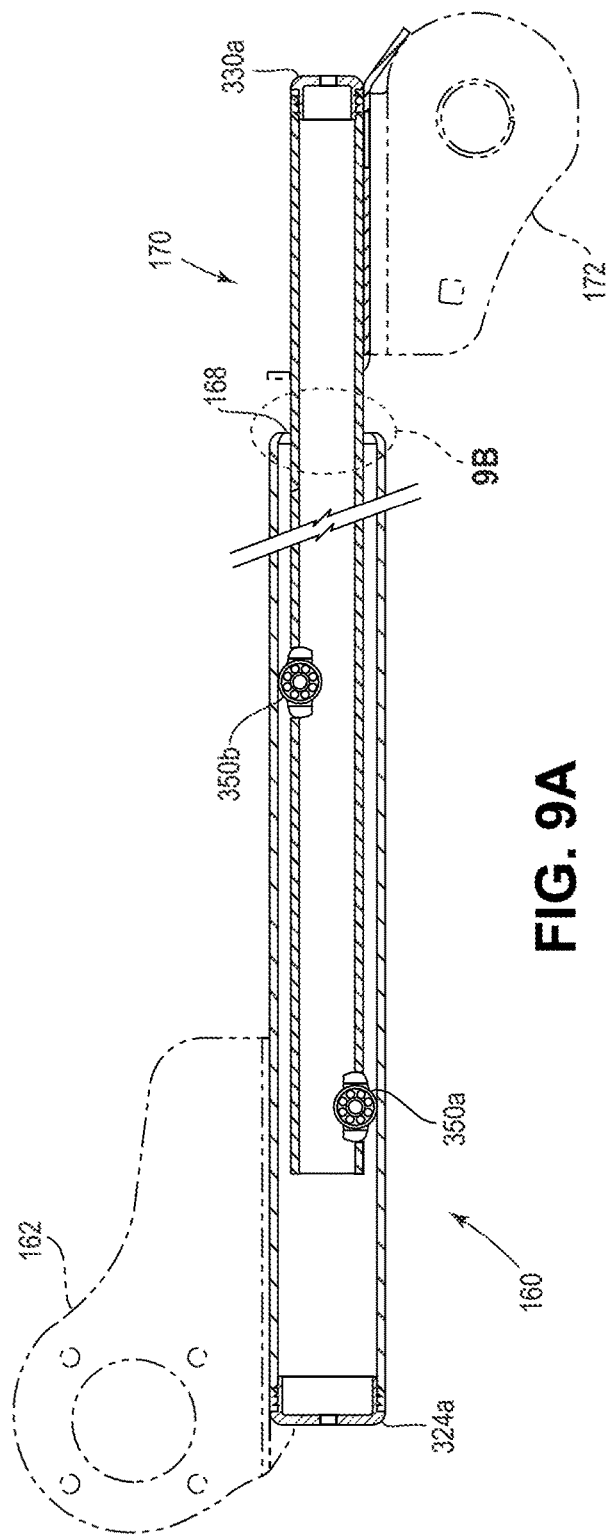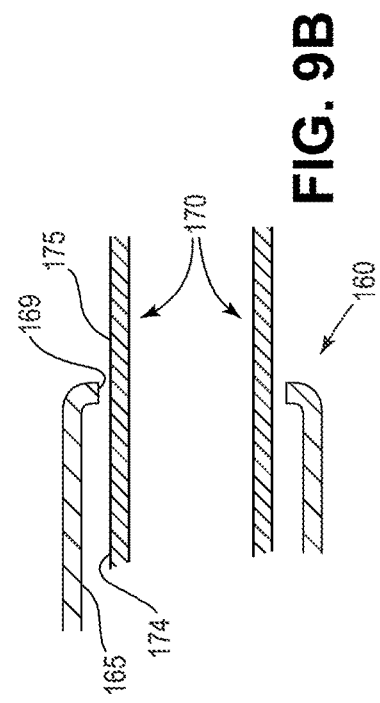

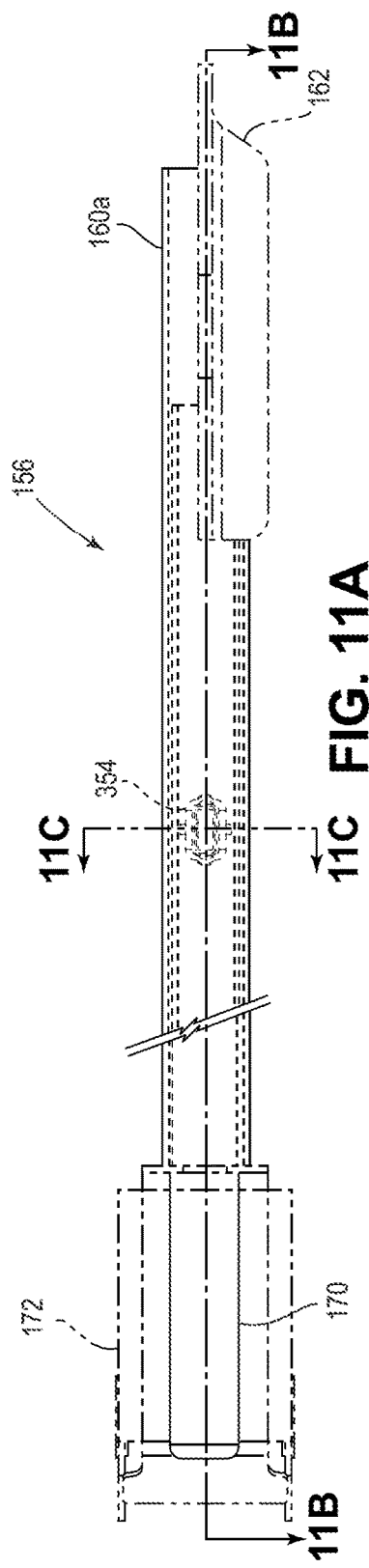
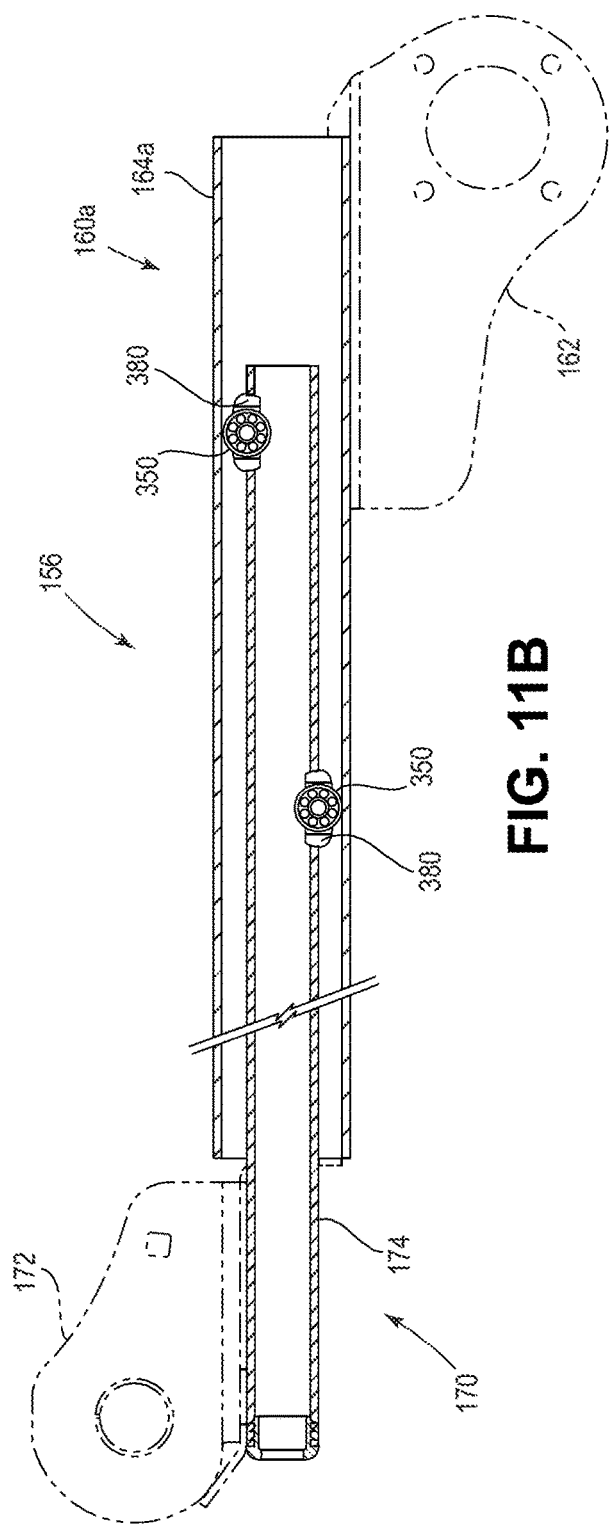

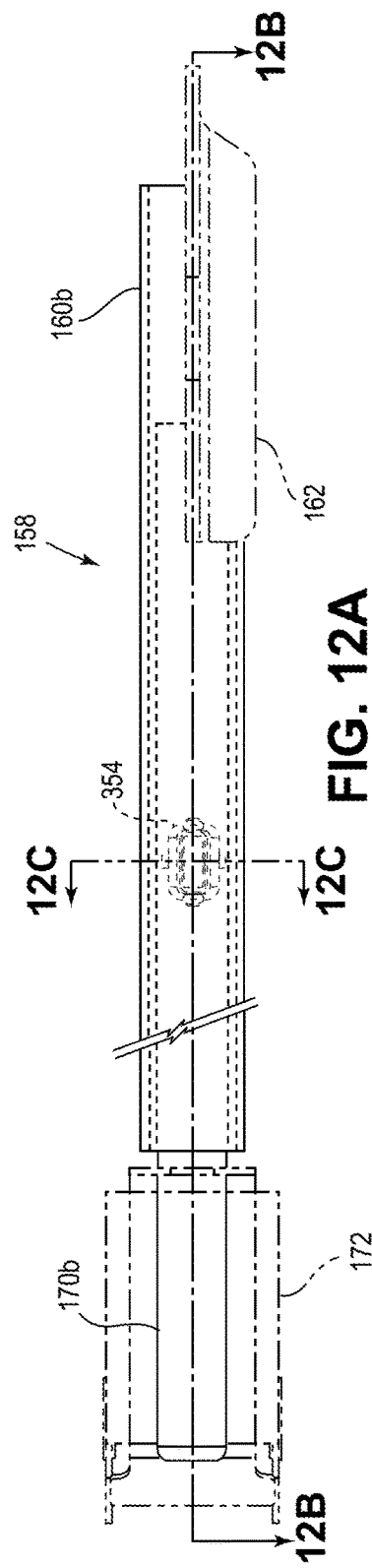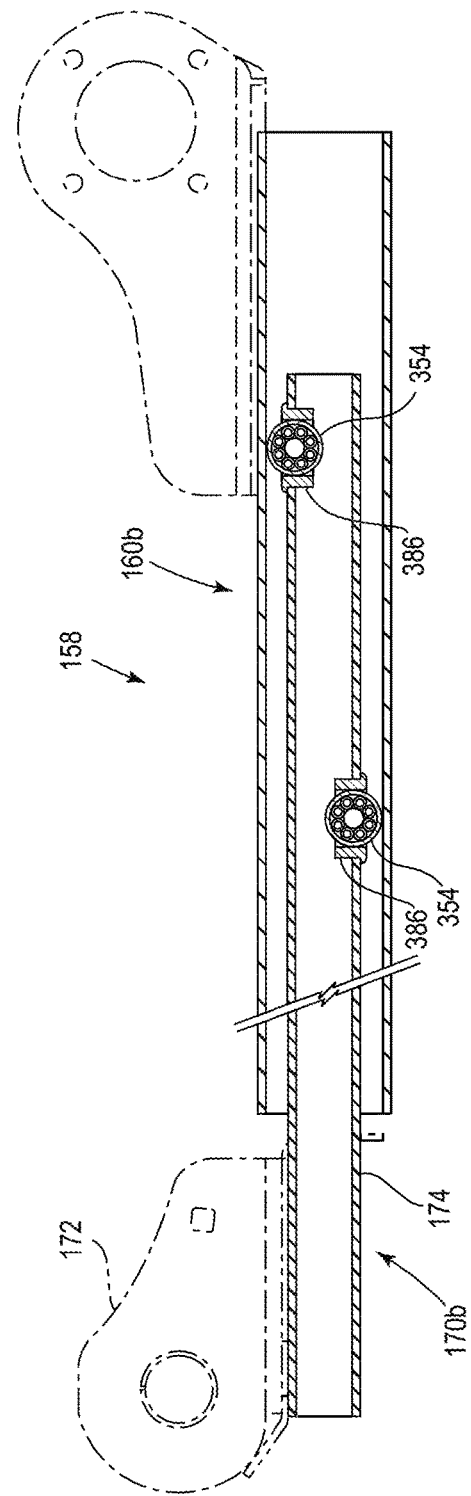
FIG. 12A
FIG. 12B

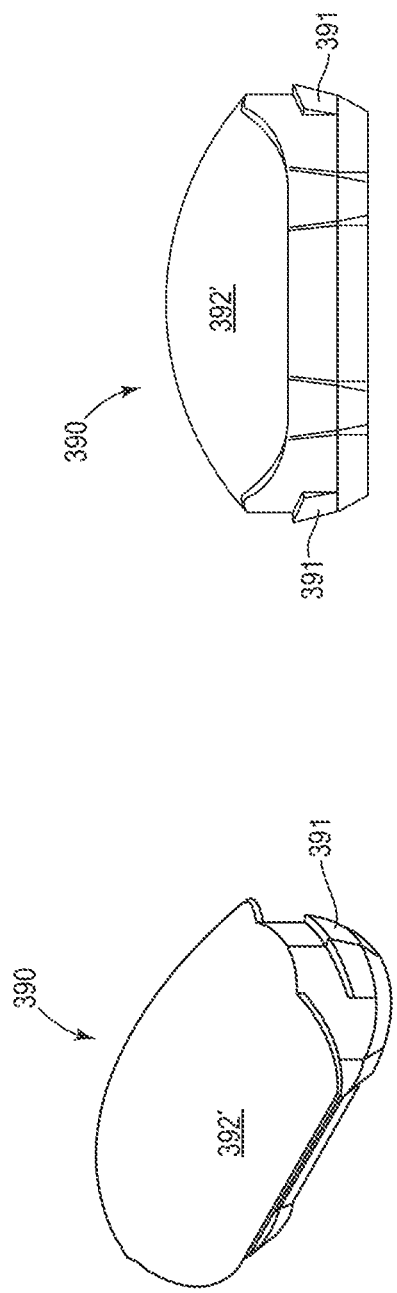
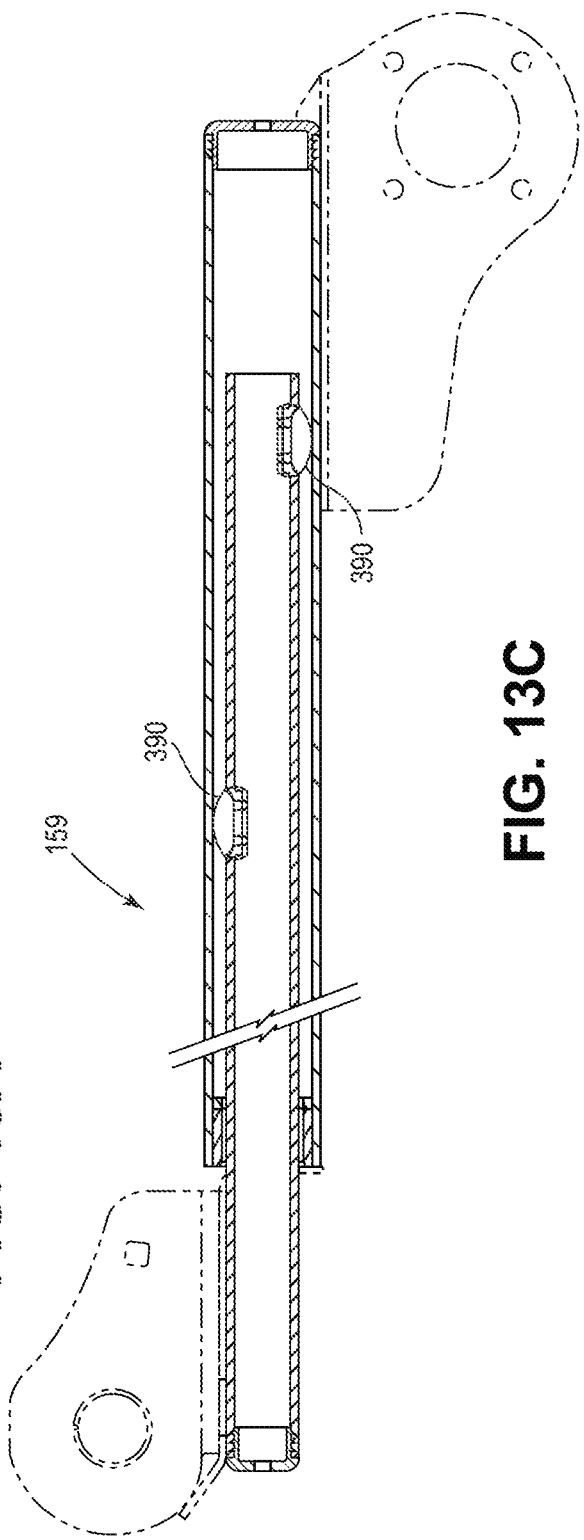

ROLL-UP TARP APPARATUS HAVING TELESCOPING ARM

CROSS-REFERENCE TO RELATED APPLICATIONS

This application claims priority benefit, under 35 U.S.C. § 119(e), of U.S. Provisional Patent Application No. 62/212,461, filed Aug. 31, 2015, entitled "Roll-Up Tarp Apparatus Having Telescoping Arm," which is incorporated herein by reference in its entirety.

BACKGROUND

Field of the Invention

The present invention relates to a roll-up tarp apparatus for an open top truck cargo box or the like. More particularly, the present invention relates to a roll-up tarp apparatus including an elongated roll bar member that is biased with at least one biasing member.

Description of the Prior Art

Roll-up tarps for truck cargo boxes are widely utilized in the trucking industry. For example, U.S. Pat. No. 4,505,512 (Schmeichel et al.) discloses a roll-up tarp apparatus for an open truck box or trailer. The roll-up tarp apparatus includes a tarp made from a flexible material. One side of the tarp is secured to the top of the truck box. The other side of the tarp is attached to a roll bar which can rotate in either direction to gather or unroll the tarp. A manual crank apparatus connected to the roll bar such as by a U-joint and collar, or a motor assembly is utilized to turn the roll bar. The roll bar is typically tubular, and generally extends from the front to the rear of the truck box or from one side to the other side of the truck box. Arms attach each end of the roll bar to the truck box. The roll bar is rolled across the truck box opening to selectively cover the truck box with the tarp or uncover the truck box. In some cases, hooks are attached to the side of the truck box opposite to the side to which the tarp is secured. The hooks retain the roll bar when the tarp is covering the truck box. Some known roll-up tarp assemblies utilize a crank to control the movement of the roll bar and others, such as that of U.S. Pat. No. 4,673,208 (Tsukamoto), utilize a motorized arm that is interconnected to the roll bar.

A biasing member can be used to help keep the tarp taut, or to assist the motor in moving the roll bar in either a roll-up or an unroll direction. Typically, a bungee cord is connected to a collar located on the roll bar, and one end of the bungee cord extends from the collar, around an edge of the truck box, and along at least part of the length of the truck box where the second end of the bungee cord is attached. As the tarp is rolled up across the top opening of the truck box, the bungee cord typically stretches and rubs against the edge of the truck box. The constant stretching of the bungee cord along the corner of the truck box is a source of abrasion on the cord, which reduces the life of the bungee cord. With a motorized assembly that turns the roll bar, there is increased strain on the motor when the cord is at a reduced biasing capacity. As the roll bar rolls up or unrolls the tarp, the arms at both ends of the truck box move the roll bar across bows that support the tarp over the top opening of the truck box.

Other known roll-up tarp assemblies include springs to bias the arms in the unroll direction. Spring assists are typically used when the tarp is un-rolled from the front to the back, rather than side to side. See, for example, U.S. Pat. No. 7,188,887 (Schmeichel) and U.S. Pat. No. 7,195,304 (Schmeichel).

In some situations, the bottom ends of the arms are pivotally attached to the truck box, and the arms can change length such as with a telescoping sleeve arrangement to accommodate the geometry of the truck box. See, for example, U.S. Pat. No. 9,039,065 (Schmeichel).

The present invention addresses limitations and problems associated with the related art.

SUMMARY OF THE INVENTION

The present invention relates to roll-up tarps, more specifically, to roll-up tarps having a telescoping arm or arms. The invention also relates to methods for making and using such a roll-up tarp. In preferred embodiments the present invention provides a roll-up tarp apparatus for attachment to an open top truck trailer, the open top truck trailer having a truck box and the truck box having a top opening, the top opening being at least partially defined by two ends and first and second longitudinal sides; the roll-up tarp apparatus comprising: a flexible tarp; wherein the tarp can be interconnected to the truck box; an elongated roll bar; and a telescoping arm that can interconnect the elongated roll bar to the truck box so that the elongated roll bar can roll as it moves over the top opening so that the tarp can be wound around or unwound from the elongated roll bar when the tarp is interconnected with the roll bar; wherein the telescoping arm has a first portion and a second portion; the second portion having an inner surface, the inner surface at least partially defining a generally hollow interior; the first portion having an outer surface; wherein the first portion can slide at least partially into and at least partially within the generally hollow interior of the second portion; the first portion including first and second bearing devices incorporated into the first portion proximate the outer surface in such a manner that permits each of the respective bearing devices to engage the inner surface of the second portion when the first portion is engaged within the generally hollow interior; wherein each of the respective first and second bearing devices include a bearing surface; wherein the bearing surface of the first bearing device engages the inner surface of the second portion on a side of the inner surface opposite to the side of the inner surface that is engaged by the bearing surface of the second bearing device. The present roll-up tarp apparatus will preferably include two telescoping arms; one on the front of the trailer and one on the back, or one on one side or one on the opposite side. The respective bearing devices are preferably bearing assemblies including a bearing having a bearing surface that engages the inner surface of the second portion when the first portion is engaged within the generally hollow interior of the second portion. In preferred embodiments, the respective bearing devices are bearing assemblies; and each of the respective bearing assemblies includes a bearing clip and a bearing having a bearing surface that engages the inner surface of the second portion when the first portion is engaged within the generally hollow interior of the second portion; wherein the bearing clip can be engaged with the first portion proximate an opening in the outer surface of the first portion to hold the bearing at least partially within the opening. In preferred embodiments, the respective bearing assemblies including a bearing clip and a bearing having a bearing surface that engages the inner surface of the second portion when the first portion is engaged within the generally hollow interior of the second portion; wherein the bearing can be engaged with the first portion when positioned at least partially within an opening in the outer surface of the first portion and the bearing clip can be engaged with the first portion proximate the opening in the outer surface of the first portion to hold the bearing at least partially within the opening. In alternate embodiments, each of the respective bearings have a shaft about which the bearing surface can rotate, wherein the shaft is engaged with the first portion when it resides at least partially within the opening and the bearing clip is engaged with the first portion proximate the opening to hold the bearing at least partially within the opening. In preferred embodiments, the second portion has an inner sleeve proximate a first end of the second portion, wherein the inner sleeve has an inside surface; and wherein a first distance between the inner surface and the outer surface, when the first portion is engaged within the second portion, is greater than a second distance between the inside surface and the outer surface when the first portion is engaged within the second portion and the first portion passes through the sleeve. In alternate embodiments, the second portion preferably has a narrowing proximate a first end of the second portion; wherein a first distance between the inner surface and the outer surface when the first portion is engaged within the second portion, is greater than a second distance between an edge of the narrowing and the outer surface when the first portion is engaged within the second portion and the first portion passes through the narrowing. In further alternate embodiments, the second portion preferably has an inner sleeve and a retaining collar proximate a first end of the second portion, wherein the inner sleeve has an inside surface; and wherein a first distance between the inner surface and the outer surface when the first portion is engaged within the second portion, is greater than a second distance between the inside surface and the outer surface when the first portion is engaged within the second portion and the first portion passes through the sleeve and the retaining collar. In alternate embodiments, the second portion has an inner sleeve and a retaining collar proximate a first end of the second portion, wherein the inner sleeve has an inside surface; and wherein a first distance between the inner surface and the outer surface when the first portion is engaged within the second portion, is greater than a second distance between the inside surface and the outer surface when the first portion is engaged within the second portion and the first portion passes through the sleeve and the retaining collar; and wherein the second portion has a narrowing proximate the first end; wherein a first distance between the inner surface and the outer surface when the first portion is engaged within the second portion, is greater than a second distance between an edge of the narrowing and the outer surface when the first portion is engaged within the second portion and the first portion passes through the narrowing. In preferred embodiments, each bearing assembly includes a clip and a bearing and the first portion includes first and second openings in the outer surface for receiving the first and second bearing assemblies, respectively; the clip having first and second extensions that engage the first portion when the respective bearing assembly is seated within the respective opening so as to hold the bearing within the respective opening. In further preferred embodiments, each bearing includes a shaft about which the bearing surface can rotate when the bearing is seated within the respective opening. In further embodiments, the first portion preferably includes first and second openings in the outer surface for receiving the respective bearing assemblies; wherein the clip of each of the respective bearing assemblies can be engaged at least partially within one of the respective openings to hold the respective bearing in place at least partially within the respective opening. In further preferred embodiments, each of the respective clips of the respective bearing assembly preferably includes first and second extensions, wherein the respective extensions can be engaged at least partially within the respective opening in the first portion so as to retain the bearing at least partially within the respective opening.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include corresponding parts, wherein;

FIG. 7A is a top view of the front telescoping arm of FIG. 2 showing the position of the upper bracket and the lower bracket in phantom and showing the lower portion of the telescoping arm within the upper portion of the telescoping arm;

FIG. 7B is a longitudinal cross section of the front telescoping arm of FIG. 7A showing the upper bearing and the lower bearing;

FIG. 7D is a top view of the rear telescoping arm of FIG. 3 showing the position of the upper bracket and the lower bracket in phantom and showing the lower portion of the telescoping arm within the upper portion of the telescoping arm;

FIG. 7E is a longitudinal cross section of the rear telescoping arm of FIG. 7D showing the upper bearing and the lower bearing, and also showing a sleeve and a stop;

FIG. 7F is a front view of the lower arm body of a telescoping arm of the roll-up tarp apparatus of FIG. 1 showing slots to receive bearings;

FIG. 7G is a transverse cross section of the lower arm body of FIG. 7F showing the locations of the slots of FIG. 7F;

FIG. 9A is a longitudinal cross section of an alternative telescoping arm similar to that of FIG. 7E but with the upper portion including a lower end flange and without a sleeve and stop;

FIG. 9B is an enlarged detail view of a portion of FIG. 9A;

FIG. 11A is a top view of an alternative telescoping arm similar to that of FIG. 7E but having an upper body which is oval and without a sleeve and stop;

FIG. 11B is a longitudinal cross section of the alternative telescoping arm of FIG. 11A;

FIG. 12A is a top view of an alternative telescoping arm similar to that of FIG. 7E but having an upper body which is rectangular and a lower body which is rectangular and without a sleeve and stop;

FIG. 12B is a longitudinal cross section of the alternative telescoping arm of FIG. 12A;

FIG. 13A is a perspective view of an alternative bearing device, having a bearing surface, which can be used in place of the upper bearing or the lower bearing of the various telescoping arms of FIGS. 1-12;

FIG. 13B is a front view of the alternative bearing device of FIG. 13A;

FIG. 13C is a view of an alternative telescoping arm similar to that of FIG. 7E, but incorporating the alternative bearing device of FIG. 13A.

DETAILED DESCRIPTION

Figure 1:
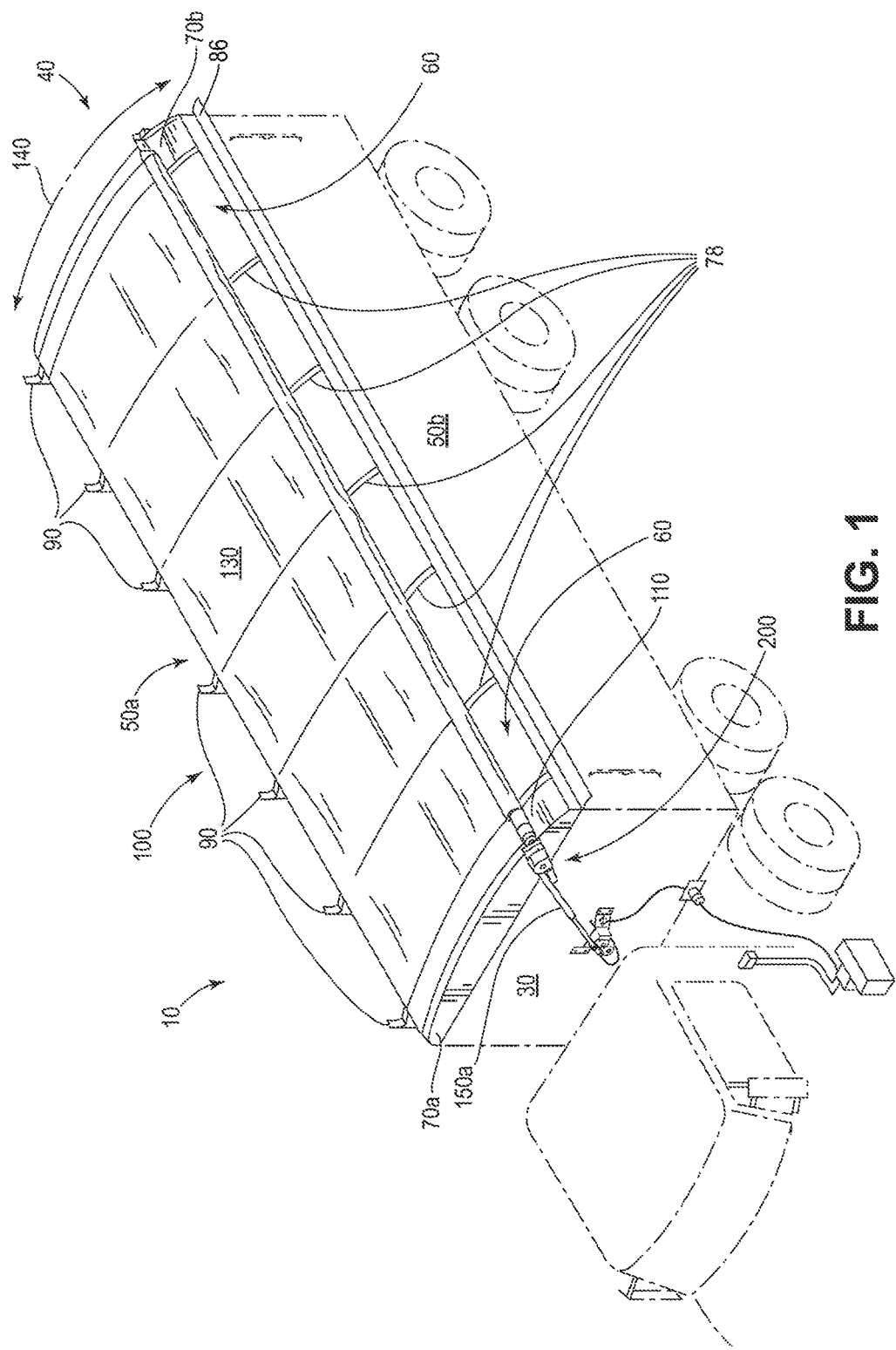
FIG. 1 is a perspective view of a roll-up tarp apparatus operatively secured over a trailer or a truck box of a truck and showing the flexible tarp in a partially open position.

Referring now to the drawings, and particularly to FIGS. 1-6, a roll tarp apparatus 100 is disclosed for attachment to a truck 10. Truck 10 may be a grain truck, for example, which has a truck trailer or truck box 20 having a front 30, a back 40, two sides 50a and 50b, collectively called trailer walls, and an open top 60. The roll tarp apparatus 100 includes a roll bar 110 to which an end or longitudinal edge of flexible tarp 130 is secured. The opposite end or longitudinal edge of flexible tarp 130 is secured to a trailer wall such as the side or longitudinal side 50a of the truck box 20. The roll bar 100 is secured to the truck box 20 by telescoping arms 150a, 150b. Typically two telescoping arms 150a, 150b are attached to the roll bar 110, one at each end of truck box 20, to control the position of the roll bar 110. In some cases, a single telescoping arm 150 can be used, attached to the roll bar 110 at one end. Telescoping arms 150a, 150b are separately pivotally attached to the front 30 and the back 40, respectively, of the truck box 20.

The telescoping arms 150a, 150b have an upper portion 160 and a lower portion 170 which telescope to allow the length of the telescoping arms 150a, 150b to adjust in length. The upper portion 160 has a generally hollow interior so that the lower portion 170 can slide at least partially into and at least partially engage the upper portion 160. Typically, the upper portion 160 and the lower portion 170 are generally tubular, and are sized so that the lower portion 170 can slide within the upper portion 160.

The lower end of the telescoping arms 150a, 150b pivotally attach to the truck box. Typically, one of the telescoping arms 150a is attached to the front 30 of the truck box 20 and another of the telescoping arms 150b is attached to the rear 40 of the truck box 20; in this case the flexible tarp 130 is attached to the truck box 20 along one of the trailer walls or sides 50a, 50b. The upper end of the telescoping arms 150 attach to the roll bar 110 while allowing the roll bar 110 to rotate. Rotating the roll bar 110 in one direction rolls up the flexible tarp 130 onto the roll bar 110 as the roll bar moves along the open top 60 of the truck box 20 and provides access to the open top 60 of the truck box 20. Rotating the roll bar 110 in the other direction unrolls the flexible tarp 130 from the roll bar 110 as the roll bar moves along the open top 60 of the truck box 20 to cover the open top 60 of the truck box 20. As the roll bar 110 rotates, the roll bar moves along the open top 60 of the truck box 20, and the telescoping arms 150a, 150b pivot while helping to maintain orientation and alignment of the flexible tarp 130.

Figure 3:
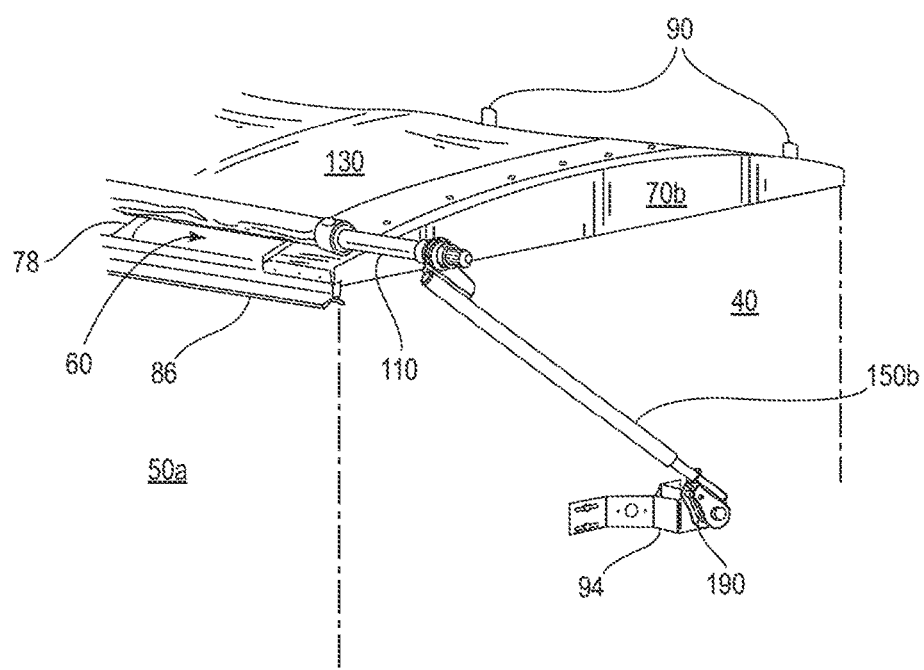
FIG. 3 is an enlarged perspective view of a portion of the back of the truck box and portions of the roll-up tarp apparatus of FIG. 1 and showing the rear telescoping arm with the flexible tarp in a partially open position.
Figure 4:
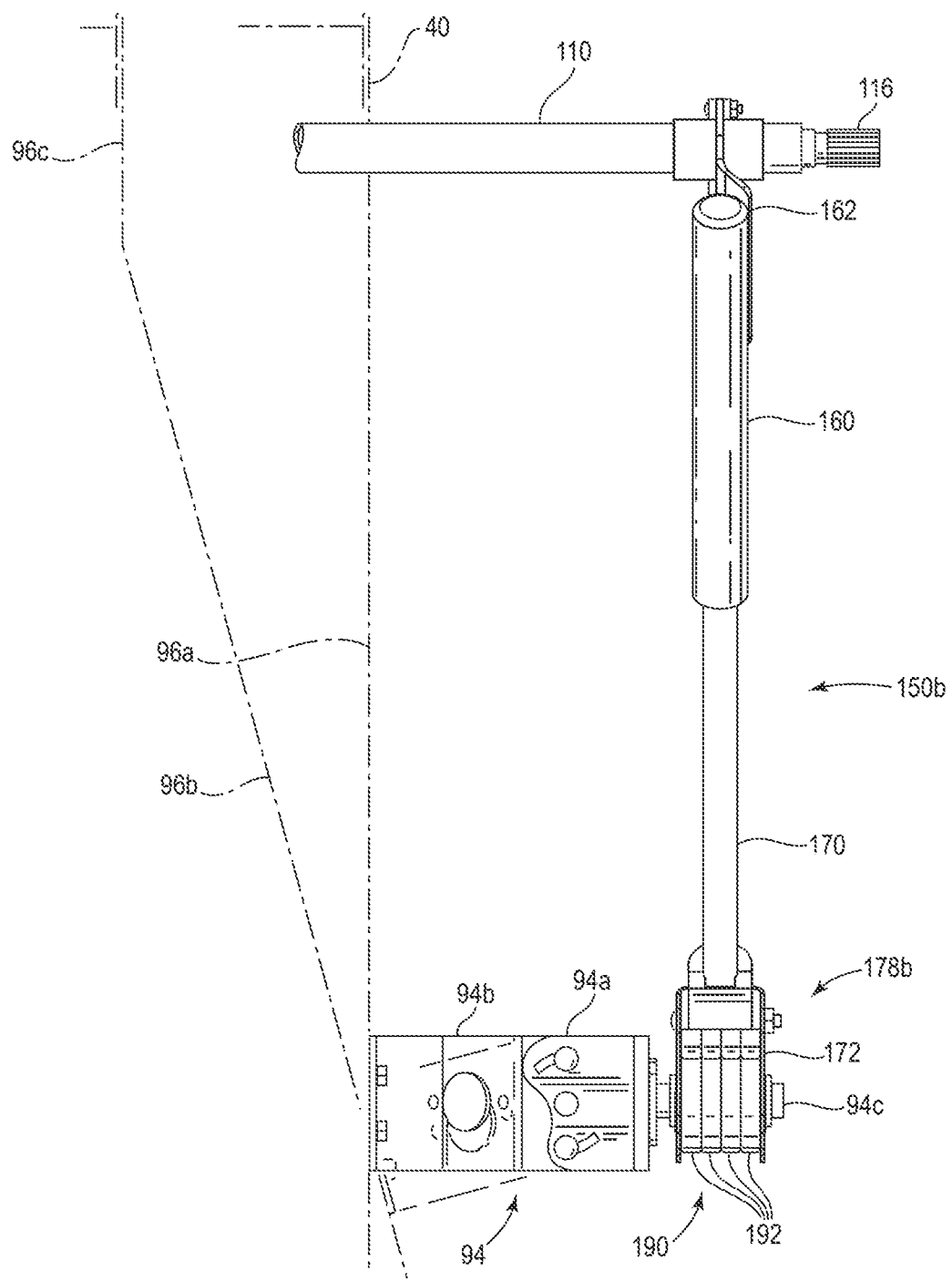
FIG. 4 is a view of the rear telescoping arm attached to the back of the truck box and showing a portion of the roll bar and trailer bracket, with the back of the truck box in phantom illustrating different trailer wall angles.

The roll bar 110 can be rotated manually by attaching a crank tool (not shown) to the roll bar 110 at a non-motorized end, such as the rear end 120 shown in FIGS. 3 and 4. Preferably, however, motor assembly 200 is attached to the roll bar 110, and operates to rotate the roll bar 110. See, for example, U.S. Pat. No. 8,534,742 (Schmeichel), which is hereby incorporated herein by reference. A biasing member such as a spring 190 (FIGS. 3-5) is incorporated to keep the flexible tarp 130 taut, while allowing the roll bar 110 to rotate and move across the open top 60 of the truck box 20. Spring 190 can include a plurality of spring elements such as clock springs 190a, 190b, 190c, 190d, as best seen in FIG. 4.

The biasing member such as the spring 190 can advantageously be located at the bottom end of the telescoping arm 150a, 150b where it attaches to the truck box 20, so that it can impart a rotational force onto the telescoping arm 150a, 150b. Preferably, each telescoping arm 150a, 150b has an associated spring 190 to apply similar forces to each end of the roll bar 110 and thereby to keep the roll bar 110 properly aligned rather than skewed, which could interfere with reliable rolling up and unrolling of the flexible tarp 130.

As will be discussed in greater detail in reference to FIG. 14 below, as force is applied in one direction to the bottom end 178*b* of the telescoping arm 150*a* by the spring 190, and in the other direction to the top end 178*a* of the telescoping arm 150*a* by tension of the flexible tarp 130, a lower portion 170 of telescoping arm 150*a* tends to tilt or cant within upper portion 160 of telescoping arm 150*a*. As the roll bar 110 moves along the open top 60 of the truck box 20, the lower portion 170 slides within the upper portion 160. As the lower portion 170 slides within the upper portion 160, and especially when the lower portion 170 is tilted or canted within the upper portion 160, there can be significant frictional forces, and resulting wear and other problems associated with the sliding motion. Such problems can include difficulty in telescoping, increased noise, unwanted vibration, premature wear on the upper portion 160 and/or the lower portion 170, increased force requirements in manual operation or increased motor forces, skewing or misalignment of the roll bar 110, uneven roll-up or unrolling of the flexible tarp 130, and other problems. To reduce the frictional forces associated with sliding of the lower portion 170 within the upper portion 160 of the telescoping arm 150*a*, the telescoping arm 150*a* includes bearing devices 390 such as bearing assemblies 394 including upper bearing 350*a*, lower bearing 350*b* which are located to provide reduced-friction bearing surface(s) 392 for the sliding motion by having the bearing surface(s) 392 engage the inner surface 165 of the upper portion 160 when the lower portion 170 is at least partially engaged within the upper portion 160. Preferably, there are two bearing surfaces 392 which engage opposite sides of the inner surface 165 of upper arm 160. For example, the upper bearing 350*a* and lower bearing 350*b* can be attached to the lower portion 170 approximately 180 degrees apart as shown.

In cases where two telescoping arms 150*a*, 150*b* are used, telescoping arm 150*b* could have the same issues just described for telescoping arm 150*a*; therefore, telescoping arm 150*b* also includes bearings 350 which are located to provide reduced-friction bearing surfaces for the sliding motion.

Examining FIGS. 1-3 in greater detail, one can see additional elements which can advantageously be included in the roll tarp apparatus 100. End caps 70*a* and 70*b* are typically located along the upper edges of the front 30 and the rear 40 of truck box 20 as shown and provide support for the ends or lateral edges of the flexible tarp 130. Support bows 78 are typically provided between the end caps 70*a* and 70*b* to provide support for the flexible tarp 130 at one or more intermediate locations. Typically, the end caps 70*a* and 70*b* have a curved upper surface which facilitates passage of the roll bar 110 and flexible tarp 130 thereupon. The support bows 78 have a similar curved shape so that the end caps 70*a* and 70*b* and support bows 78 support the flexible tarp 130 in a corresponding curved shape. Further, the end caps 70*a* and 70*b* and support bows 78 support the flexible tarp 130 and roll bar 110 as they advance in either direction across the open top 60 of truck box 20 to cover or uncover the open top 60. The generally curved shape is preferred in order to minimize flapping of the flexible tarp 130 and allow precipitation to shed off the flexible tarp 130 more easily; however, in some applications a generally flat shape can be utilized, with end caps 70*a* and 70*b* and support bows 78 having little or no curvature. In some applications, one side 50*a* or 50*b* (or front 30 or rear 40) could be higher than the opposite side.

As described in the commonly owned U.S. Pat. No. 8,226,150 to Schmeichel, which is incorporated herein by reference, the preferred flexible tarp 130 is made of vinyl coated polyester preferably having a weight of from about 10-22 ounces per square yard, preferably about 18 ounces per square yard, although lighter or heavier material could be used. The preferred flexible tarp 130 is generally rectangular, with one end or longitudinal edge affixed to the truck box 20 and the other end or longitudinal edge affixed to the roll bar 110 as previously described, and two sides or lateral edges extending between the two ends. The description of "ends" and "sides" is for ease of description and not dimensional limitations, and the dimensions of the flexible tarp 130 can be such that the "length" between the "ends" is greater than or similar to or less than the "width" between the sides. One end of the flexible tarp 130 is secured to the roll bar 110. The other end of the flexible tarp 130 is attached to the truck box 20 along one of the trailer walls, typically along side 50*a*, so that the flexible tarp 130 will open towards side 50*a* as it is rolled up onto roll bar 110. Alternatively, the flexible tarp 130 can be attached to the truck box 20 along side 50*b*, so that the flexible tarp 130 will open towards side 50*b* as it is rolled up onto roll bar 110.

The roll-up tarp apparatus 100 preferably further includes a latch plate 86 along the side 50*b* or 50*a* opposite the side to which the flexible tarp 130 is attached. The latch plate 86 can be a single long plate or rail as shown, or a plurality of shorter segments, and preferably has a downwardly facing curved surface that is configured and arranged to receive the roll bar 110 when the flexible tarp 130 is unrolled and covering the open top 60. A plurality of stops 90 are preferably located along the trailer wall to which the flexible tarp 130 is attached, typically side 50*a*; the stops 90 serve to control the position of the roll bar 110 and flexible tarp 130 when the flexible tarp 130 is rolled up onto the roll bar 110 exposing the open top 60 of the truck box 20.

Figure 5:
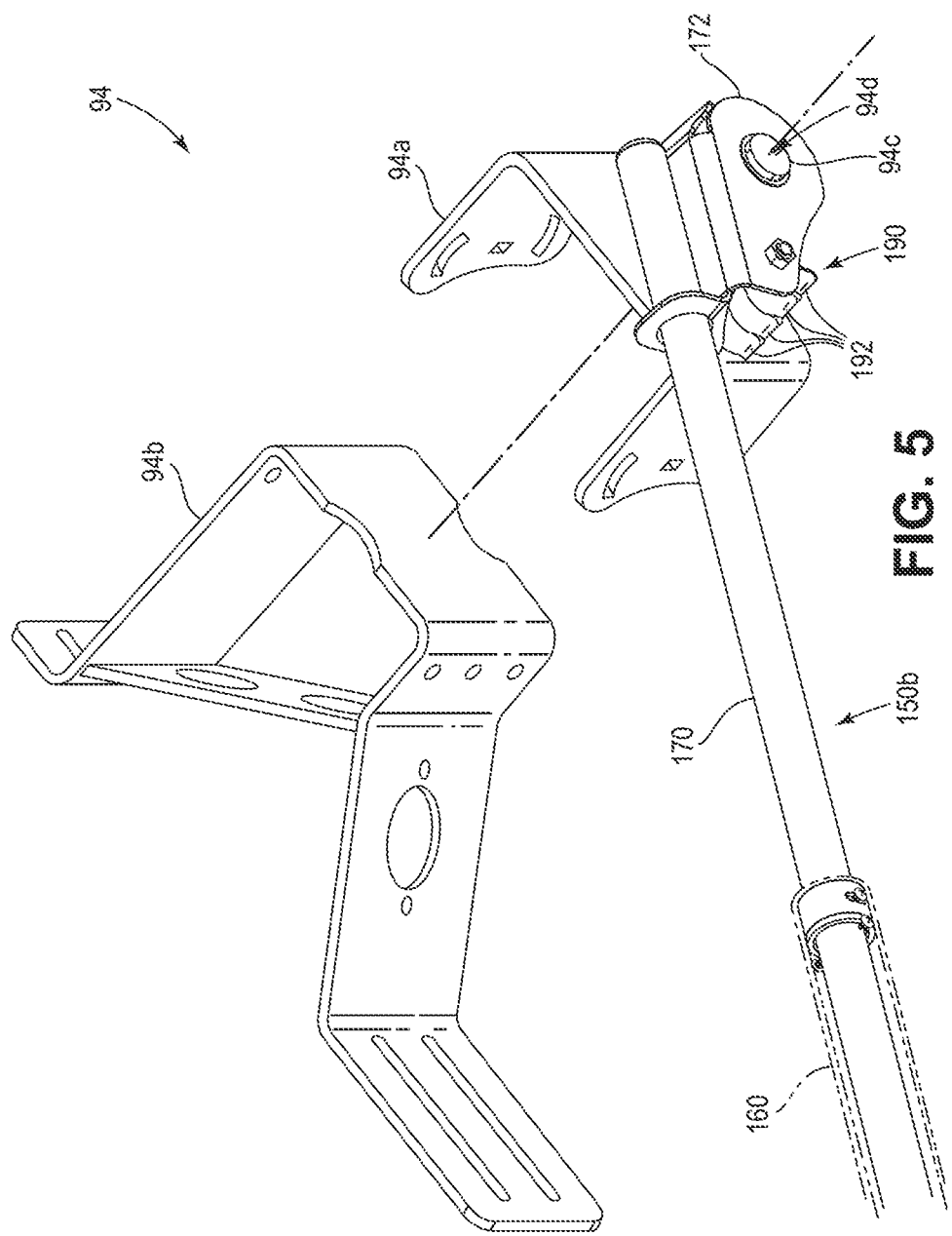
FIG. 5 is a partially exploded perspective view of portion of the telescoping arm of FIG. 4.

Referring now to FIGS. 4 and 5, which illustrates the telescoping arm 150*b*, having an upper portion 160 and a lower portion 170 which can slide in and out within the upper portion 160 to allow the telescoping arm 150*b* to adjust in length as the telescoping arm 150*b* rotates while the roll bar 110 is rotating and the flexible tarp 130 is unrolling or rolling up to cover or uncover the open top 60 of the truck box 20. An upper arm bracket 162 attached to the upper portion of the upper portion 160 provides for attachment of the upper portion 160 to the roll bar 110. A lower arm bracket 172 attached to the lower portion of the lower portion 170 provides for attachment of the lower portion 170 to a trailer bracket 94 which is attached to a one of the trailer walls. The trailer bracket 94 is attached to the back 40 of the truck box 20 as shown on FIGS. 3 and 4. There is another trailer bracket 94 which is attached to the front 30 of the truck box 20, as seen on FIGS. 1 and 2. Trailer bracket 94 provides for attachment to one of the trailer walls of the truck box 20 that is oriented at a trailer wall angle 96. The trailer wall may be oriented vertically as in trailer wall angle 96*a*, or may be oriented at an angle from the vertical as in trailer wall angle 96*b*. Trailer wall angle 96 may be slanted inward or outward, and the trailer wall may have more than one angle, such as having a portion at trailer wall angle 96*c*, which may be positive or negative. The trailer bracket 94 attaches to trailer walls, the front 30 as shown in FIG. 2, the back 40 as shown in FIG. 4. The lower arm bracket 172 of the telescoping arm 150*a*, 150*b* pivotally attaches to the trailer bracket 94, allowing the telescoping arm 150*a*, 150*b* to pivot about the bottom end 178*b* as the roll bar 110 moves across the open top 60 of the truck box 20 and the flexible tarp 130 rolls up and unrolls. Preferably, the trailer bracket 94 includes a connector portion 94*a* which can rotate with respect to a trailer portion 94*b* to accommodate various trailer wall angles 96. The spring 190 is located at lower arm bracket 172 and applies a torsional force between the trailer bracket 94 and the lower arm bracket 172 which urges the telescoping arm 150 to move away from the trailer wall (side 50*a* in the example shown in FIGS. 1-4) to which the flexible tarp 130 is secured, thereby maintaining tension on the flexible tarp 130 to keep the flexible tarp 130 taut. The connector portion 94*a* of the trailer bracket 94 preferably includes a shaft 94*c* on which the lower bracket 172 and the telescoping arm 150*a*, 150*b* pivots. The spring 190 is preferably configured and arranged to apply force to the shaft 94*c*; a slot or opening 94*d* along shaft 94*c* is illustrated in the drawings (FIGS. 5-6), but various flats, fasteners, and the like can be utilized to couple the spring 190 to the shaft 94*c*. The roll bar 110 has a spline 116 which is exposed and not covered by the flexible tarp 130. The spline 116 provides for rotation of the roll bar 110 to be driven by a hand crank tool (not shown). While various configurations are possible, FIGS. 4 and 5 illustrate the configuration of telescoping arm 150*b* of FIG. 3.

Figure 2A:
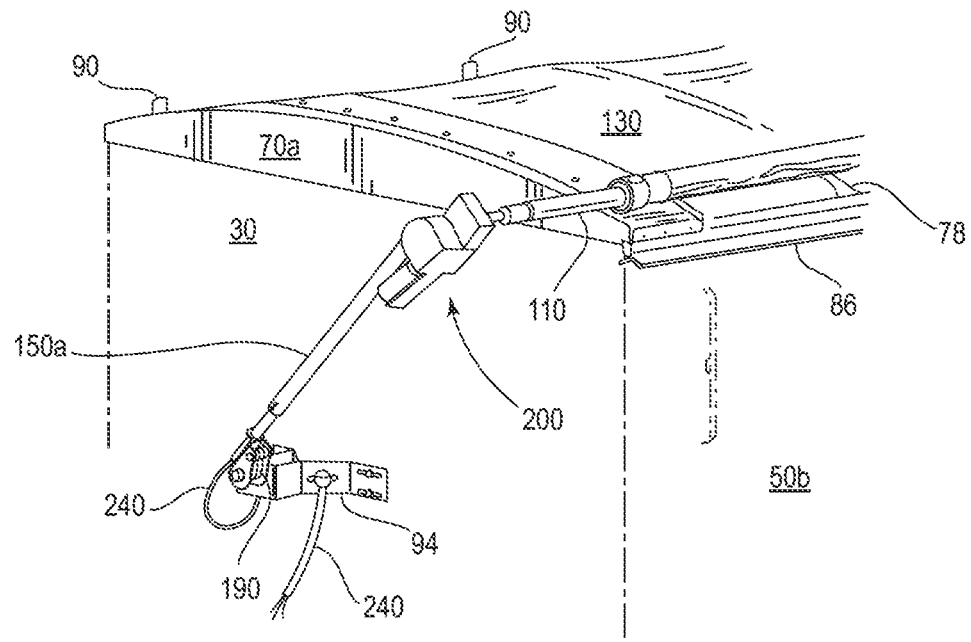
FIG. 2A is an enlarged perspective view of a portion of the front of the truck box and portions of the roll-up tarp apparatus of FIG. 1 showing a front telescoping arm and with the flexible tarp in a partially open position.
Figure 2B:
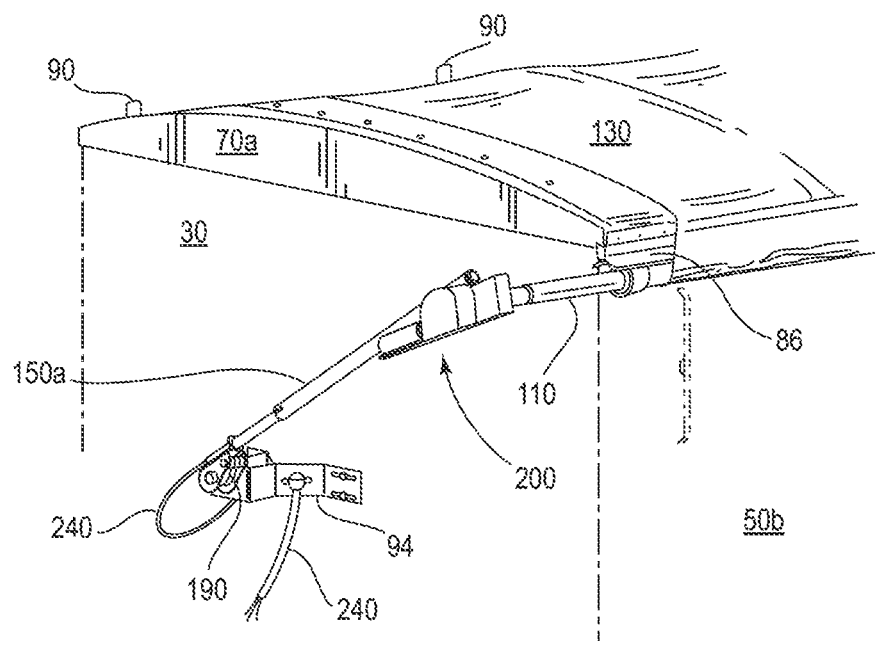
FIG. 2B is an enlarged perspective view of a portion of the front of the truck box and portions of the roll-up tarp apparatus of FIG. 1 similar to FIG. 2A but with the flexible tarp in a closed position.
Figure 6:
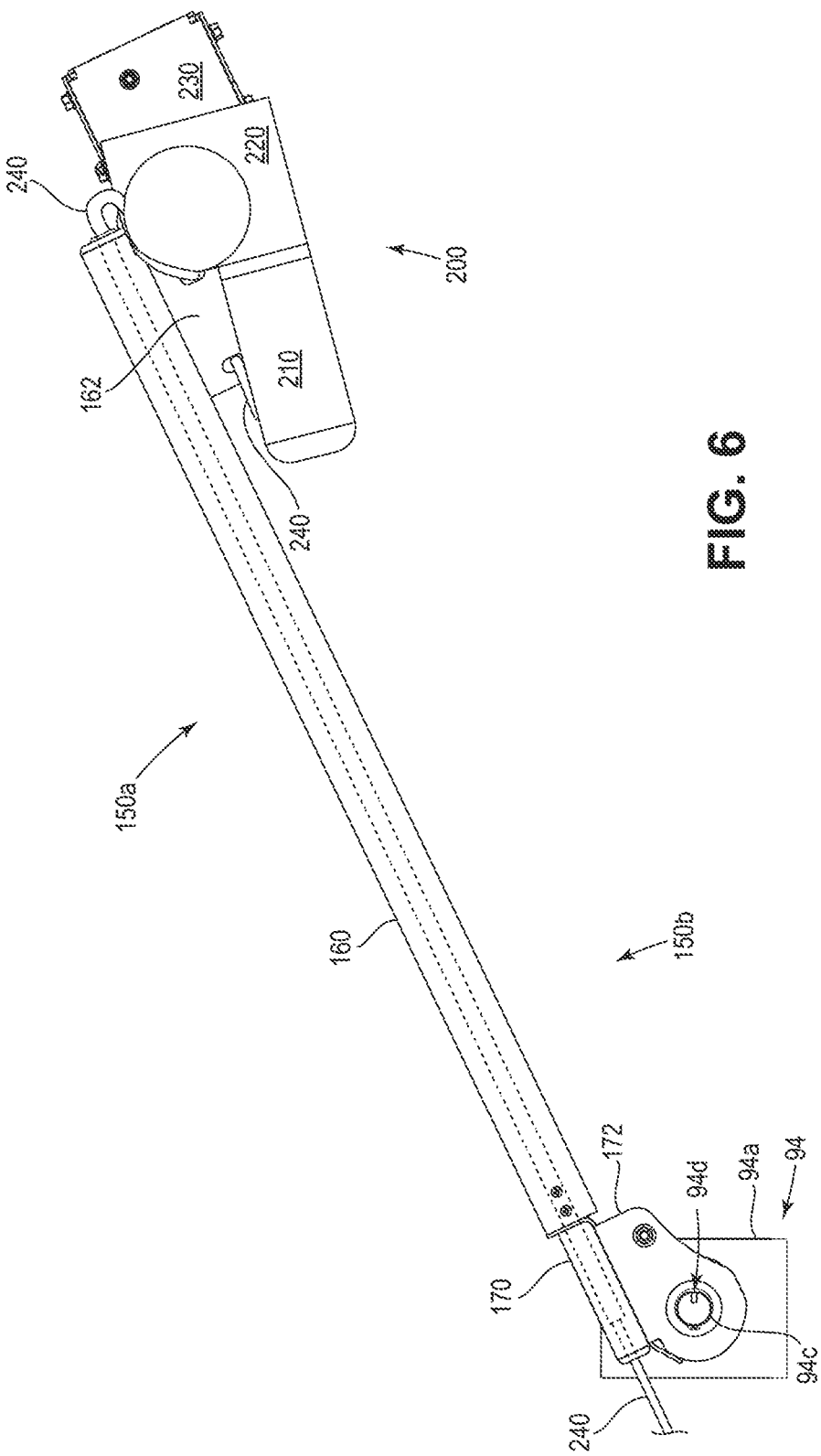
FIG. 6 is a view of the front telescoping arm of FIG. 2 showing a motor assembly and other details.

FIG. 6 further illustrates the configuration of telescoping arm 150*a* of FIGS. 1, 2A, and 2B. In this example, rotation of the roll bar 110 is provided by the motor assembly 200 which is attached to the upper arm bracket 162. The motor assembly 200 preferably includes a motor 210 to which a worm gear 220 is attached; a gearbox 230 is attached to the worm gear 220 and configured and arranged to drive the roll bar 110. Preferably, the roll bar 110 has a spline (not visible) similar to the spline 116 to which an element of the gearbox 230 interfaces. A motor power cord 240 is connected to the motor 210 to provide electrical power to operate the motor 210. The upper portion 160 is generally tubular so that the lower portion 170 can extend inside of the upper portion 160. The lower portion 170 is preferably generally tubular as well, and motor power cord 240 can extend through both the lower portion 170 and the upper portion 160, extending through the length of the telescoping arm 150*a*. A spring 190 is located at the lower end of lower portion 170 and applies torque between the trailer bracket 94 and the lower arm bracket 172 to urge the telescoping arm 150*a* in a direction that tends to keep the flexible tarp 130 taut, as described relative to similar structures shown on FIGS. 4, 5, and 13.

Figure 7C:
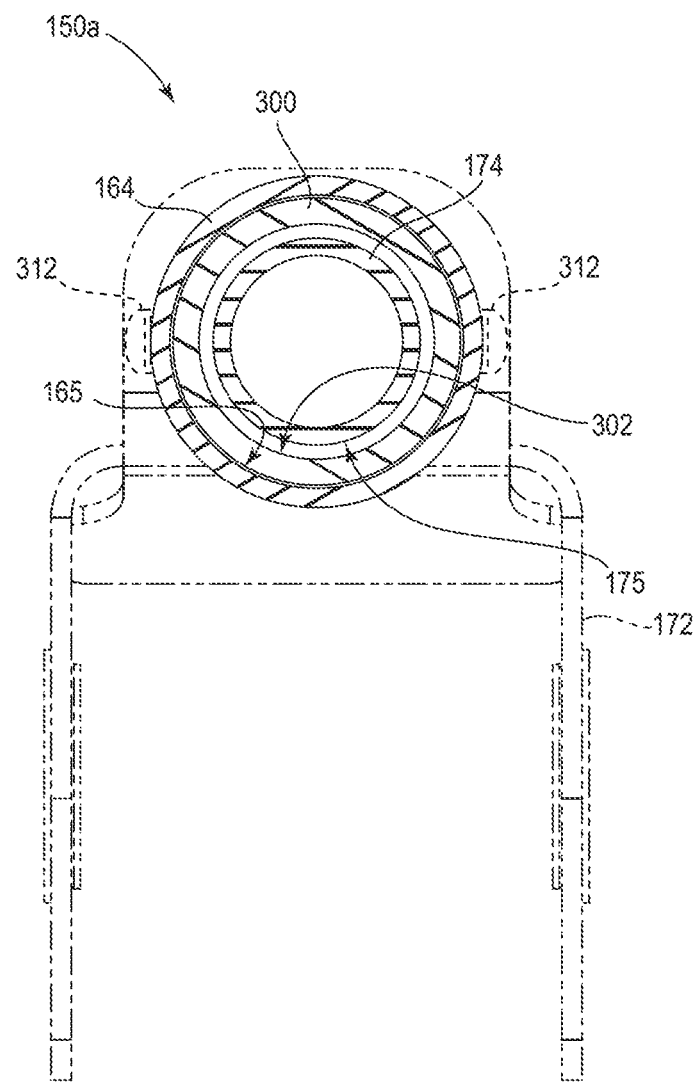
FIG. 7C is enlarged transverse cross section of the front telescoping arm of FIG. 7A showing the lower portion within the upper portion.

Referring now to FIGS. 7A-7C, further details regarding the telescoping arm 150*a* are illustrated. In FIGS. 7A-7C, the upper arm bracket 162 and the lower arm bracket 172 are shown in phantom to indicate their general location. FIG. 7A illustrates the upper portion 160 into which lower portion 170 extends. The upper portion 160 has an upper arm body 164 which is preferably metal and tubular. The lower portion 170 has a lower arm body which is also preferably metal and tubular. A sleeve or inner sleeve 300, which has an inner diameter through which the lower portion 160 passes, is held in position by screws 312 which affix the sleeve 300 to the upper arm body 164. The sleeve 300 is preferably a plastic sleeve, but could alternatively be a metal such as brass or stainless steel, or a coated metal, for example. The sleeve 300 can function to reduce debris entrance into the telescoping arm 150. Adjacent to the sleeve 300 is a stop or retaining collar 306, which has an inner diameter through which the lower portion 170 also passes, and which is captured between the sleeve 300 and additional screws 312. The stop 306 provides a stop to prevent the lower portion 170 from sliding all the way out of the upper portion; the stop 306 can also prevent contact between the lower bearing 350*b* and the sleeve 300 which could otherwise damage the sleeve 300. The screws pass through holes 318 in the upper body 164. Preferably, the stop 306 is metal, and the inner diameter of the stop 306 is preferably larger than the inner diameter of the sleeve 300, in order to reduce metal scraping of the lower arm body 174 as the lower portion 170 slides within the stop 306.

FIG. 7B illustrates a cross sectional view of the telescoping arm 150*a* as indicated in FIG. 7A. The lower portion 170 includes an upper bearing 350*a* and a lower bearing 350*b*. (The bearing 350*b* is also indicated in phantom in FIG. 7A, but the bearing 350*a* would have been largely obstructed by the upper arm bracket 162 shown in phantom and is not shown in FIG. 7A for clarity of illustration.) Preferably, the telescoping arm 150*a* (and various other telescoping arms 150*b*, 152, 154, 156, 158 described herein) includes an upper cap 324*a* and a lower cap 330*a* which reduce debris entrance into the telescoping arm 150*a*. The upper cap 324*a* and the lower cap 330*a* of telescoping arm 150*a* preferably have holes through which the motor power cord 240 (FIG. 6) passes. The upper cap 324*a* and the lower cap 330*a* are preferably compression fit into the upper arm body 164 and the lower arm body 174, respectively. When the telescoping arm 150*a* is mounted on the truck box 20, tension from the taut flexible tarp 130 applies a force upon the upper arm bracket 162 in an upward direction in the view of FIG. 7B, and the spring 190 applies a torque upon the lower arm bracket 172 in a clockwise direction, as further illustrated below with respect to FIG. 14. Because this force and torque are applied to the telescoping arm 150*a* in this manner, the upper bearing 350*a* is located on the bottom side of the lower arm and near the right end as illustrated in FIG. 7B, and the lower bearing 350*b* is located on the top side of the lower arm and farther from the right end in the view of FIG. 7B. By this arrangement, upper bearing 350*a* and lower bearing 350*b* contact the inside surface of upper arm body 164, providing reduced frictional forces as the lower portion 170 slides within the upper portion 160.

FIG. 7C is a cross sectional view of the telescoping arm 150*a* as indicated in FIG. 7A. The sleeve 300 is held in place within the upper arm body 164 by screws 312 which are shown in phantom. The lower arm body 174 passes within the sleeve 300 as shown. The location of lower arm bracket 172 is shown in phantom. The upper arm body 164 has an inner surface 165, and the lower arm body 174 has an outer surface 175. The sleeve 300 has an inside surface 302. The sleeve 300 fits between the upper arm body 164 and the lower arm body 174, so that the distance between the inside surface 302 and the outer surface 175 is smaller than the distance between the inner surface 165 and the outer surface 175, as shown.

Referring now to FIGS. 7D and 7E, further details regarding the telescoping arm 150*b* are illustrated, similar to the views of the telescoping arm 159*a* shown in FIGS. 7A and 7B. In FIGS. 7D and 7E, the upper arm bracket 162 and the lower arm bracket 172 are shown in phantom to indicate their general location. FIG. 7D illustrates the upper portion 160 into which lower portion 170 extends. The upper portion 160 has an upper arm body 164 which is preferably metal and tubular. The lower portion 170 has a lower arm body which is also preferably metal and tubular. A sleeve 300, which has an inner diameter through which the lower portion 160 passes, is held in position by screws 312 which affix the sleeve 300 to the upper arm body 164. The sleeve 300 is preferably a plastic sleeve, but could alternatively be a metal such as brass or stainless steel, or coated metal, for example. The sleeve 300 can function to reduce debris entrance into the telescoping arm 150. Adjacent to the sleeve 300 is a stop 306, which has an inner diameter through which the lower portion 170 also passes, and which is captured between the sleeve 300 and additional screws 312.

The stop 306 provides a stop to prevent the lower portion 170 from sliding all the way out of the upper portion; the stop 306 can also prevent contact between the lower bearing 350b and the sleeve 300 which could otherwise damage the sleeve 300. The screws pass through holes 318 in the upper body 164. Preferably, the stop 306 is metal, and the inner diameter of the stop 306 is preferably larger than the inner diameter of the sleeve 300, in order to reduce metal scraping of the lower arm body 174 as the lower portion 170 slides within the stop 306.

FIG. 7E illustrates a cross sectional view of the telescoping arm 150a as indicated in FIG. 7D. The lower portion 170 includes an upper bearing 350a and a lower bearing 350b. (The bearing 350b is also indicated in phantom in FIG. 7D, but the bearing 350a would have been largely obstructed by the upper arm bracket 162 shown in phantom and is not shown in FIG. 7D for clarity of illustration.) Preferably, the telescoping arm 150a (and various other telescoping arms 150 described herein) includes an upper cap 324b and a lower cap 330b which reduce debris entrance into the telescoping arm 150a. The upper cap 324b and the lower cap 330b of telescoping arm 150a do not need holes since there is no motor assembly attached to telescoping arm 150b, so there is no need for passage for a motor power cord. For simplicity, caps such as upper cap 324a and lower cap 330a of FIG. 7B can be used, so that the same components can be used for both telescoping arm 150a and telescoping arm 150b. It is anticipated that in some alternative embodiments two motor assemblies 200 can be used, one attached to each of two telescoping arms 150a, 150b; however, in the preferred embodiment illustrated in FIG. 7A-7G, only one of the telescoping arms, namely the telescoping arm 150a, has a motor assembly 200 attached. The upper cap 324 and the lower cap 330 are preferably compression fit into the upper arm body 164 and the lower arm body 174, respectively. When the telescoping arm 150a is mounted on the truck box 20, tension from the taut flexible tarp 130 applies a force upon the upper arm bracket 162 in an upward direction, and the spring 190 applies a torque upon the lower arm bracket 172 in a counterclockwise direction, as further illustrated below with respect to FIG. 14. Because this force and torque are applied to the telescoping arm 150a in this manner, the upper bearing 350a is located on the bottom side of the lower arm and near the left end as illustrated in FIG. 7E, and the lower bearing 350b is located on the top side of the lower arm and farther from the left end in the view of FIG. 7E. By this arrangement, upper bearing 350a and lower bearing 350b contact the inside surface of upper arm body 164, providing reduced frictional forces as the lower portion 170 slides within the upper portion 160.

As illustrated in FIGS. 7F and 7G, the lower arm body 174 has two bearing slots 180a, 180b and associated shaft slots 184a, 184b to accommodate the bearings 350, 350a, 350b. The bearing slots 180a, 180b have a bearing slot length 182a parallel to the axis of the lower arm body 174, and a bearing slot width 182b sized to fit a commercially available bearing, such as WJB model SR4A-2RS bearings available from Motion Industries of Fargo, N. Dak. For reference, these are approximately ¾ inch in diameter and approximately 9/32 inch in width and fit onto an approximately ¼ inch shaft. These bearings are only an illustrative example; other bearing types and sizes could be used, but these have been shown to work well in the present invention. For other bearings, the bearing slots 180a, 180b would be appropriately sized for those bearings. Approximately at the center of the bearing slots 180a, 180b, there are shaft slots 184a, 184b cut transversely and sized with a shaft slot width 186a to press fit the bearing shaft 360 (FIGS. 8A and 8B) and with a shaft slot depth 186b into which the bearing shaft is secured. The upper bearing slot 180a is located a relatively short distance 188b from the upper end 176 of the lower arm body 174 to minimize scraping of the upper end 176 of the lower arm body 174 on the upper arm body 164 as the lower portion 170 slides within the upper portion 160. The distance 188c between the upper bearing slot 180a and the lower bearing slot 180b needs to be large enough to minimize tilting or canting of the lower portion 170 within the upper portion 160 when the telescoping arm 150a, 150b is under load and holding the flexible tarp 130 taut. On the other hand, the distance 188c between the upper bearing slot 180a and the lower bearing slot 180b needs to be small enough that there is sufficient travel as lower portion 170 slides within upper portion 160 as the telescoping arm 150a, 150b pivots during rolling up and unrolling of the flexible tarp 130 on the roll bar 110, without the lower bearing 350b hitting stop 306 (or coming out of upper portion 160, in alternative embodiments in which no stop is used, described below). Thus, there is a range of practical distances 188c between the upper bearing slot 180a and the lower bearing slot 180b, and between the upper bearing 350a and the lower bearing 350b when assembled into the upper bearing slot 180a and the lower bearing slot 180b, respectively. The angle 188a between upper bearing slot 180a and lower bearing slot 180b is preferably approximately 180 degrees, so that the upper bearing 350a and lower bearing 350b will be properly located in the telescoping arm 150a, 150b during use.

Figure 8A:
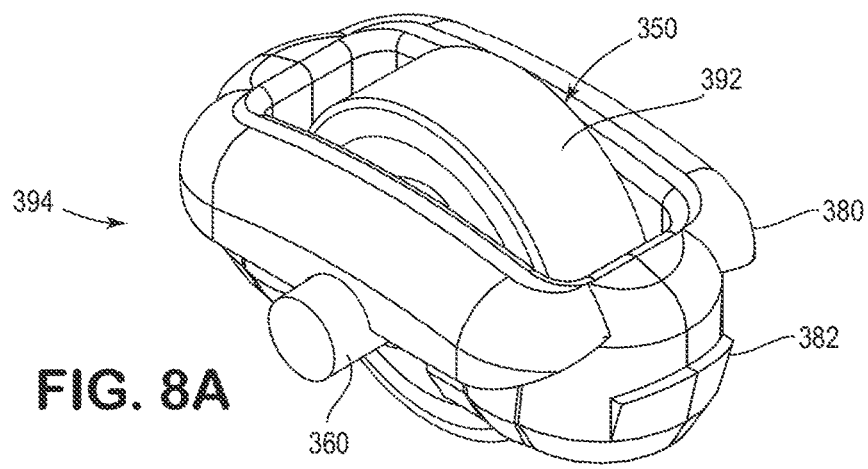
FIG. 8A is a perspective view showing a bearing and a bearing cap for assembly into the slots in the lower arm body of FIG. 7F.

FIG. 8A-8D illustrate a bearing device 390, and shows a bearing cap or bearing clip 380 which serves as a retainer to hold the bearing on bearing shaft 360 in bearing slot 180a, 180b on lower arm body 174. FIG. 8A is an isometric view showing bearing assembly 394, which includes the bearing 350 (which can be either upper bearing 350a or lower bearing 350b), the bearing shaft 360, and the bearing cap 380. Also illustrated in FIG. 8A is one of two bearing cap tabs or extensions or engagement protrusions 382, seen at one end of the bearing cap 380; there is another bearing cap tab 382 at the opposite end not visible in FIG. 8A, but seen in FIG. 8B.

Figure 8B:
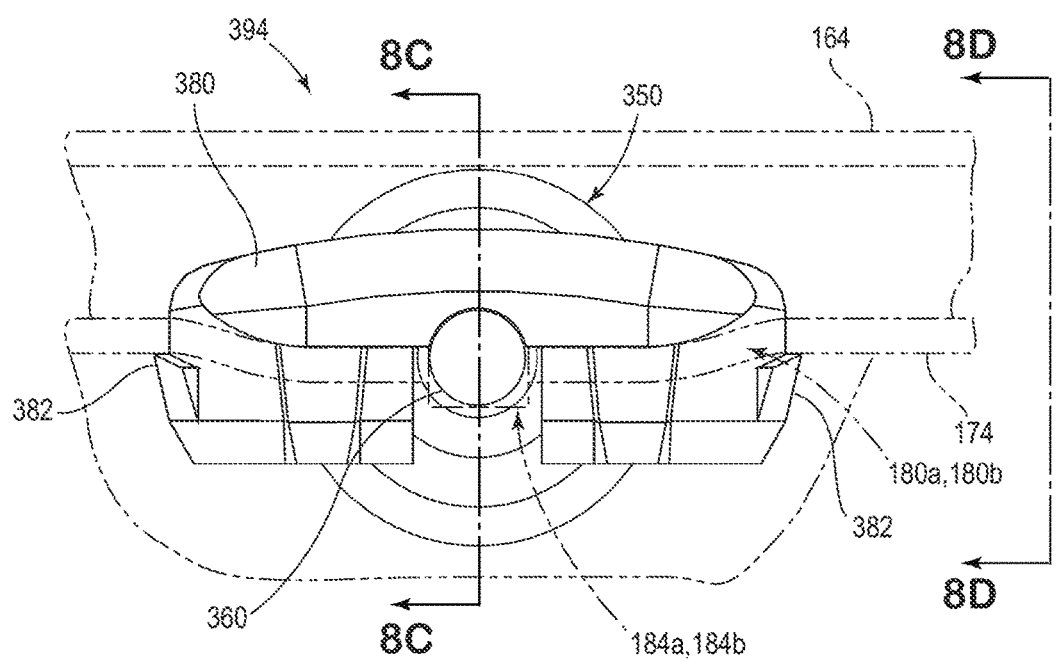
FIG. 8B is a side view showing the bearing and bearing cap of FIG. 8A assembled into the lower arm body of FIG. 7F with the positions of the lower arm body and the upper arm body shown in phantom.

FIG. 8B is a side view of a bearing 350, bearing shaft 360, and bearing cap 380, with the lower arm body 174 partially shown in phantom, to show how the bearing 350 fits partially into the bearing slot 180, with the bearing shaft 360 fitting partially into the shaft slot 184, retained by the bearing cap 380 which is partially inserted into the bearing slot 180 with the bearing cap tabs 382 snapped into place in the inside of the lower arm body 174 to keep the assembly together. Also shown on FIG. 8B is a partial phantom view of upper arm body 164, to show how the bearing 350 rides along the inside surface of the upper arm body 164 as the lower portion 170 slides within the upper portion 160.

Figure 8C:
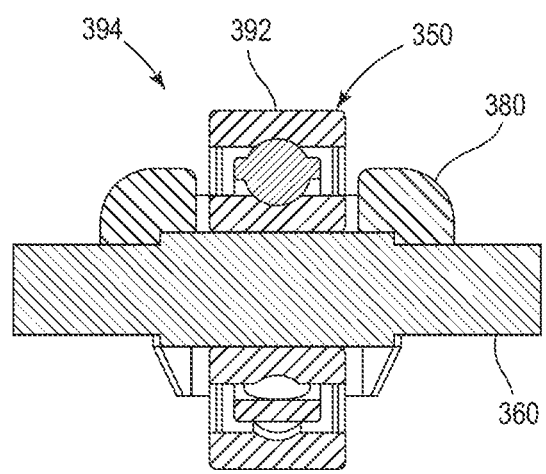
FIG. 8C is a cross section of the bearing and bearing cap of FIGS. 8A and 8B.

FIG. 8C is a cross section taken as indicated on FIG. 8B, showing the relationship of the bearing 350 on the bearing shaft 360 and the bearing cap 380.

Figure 8D:
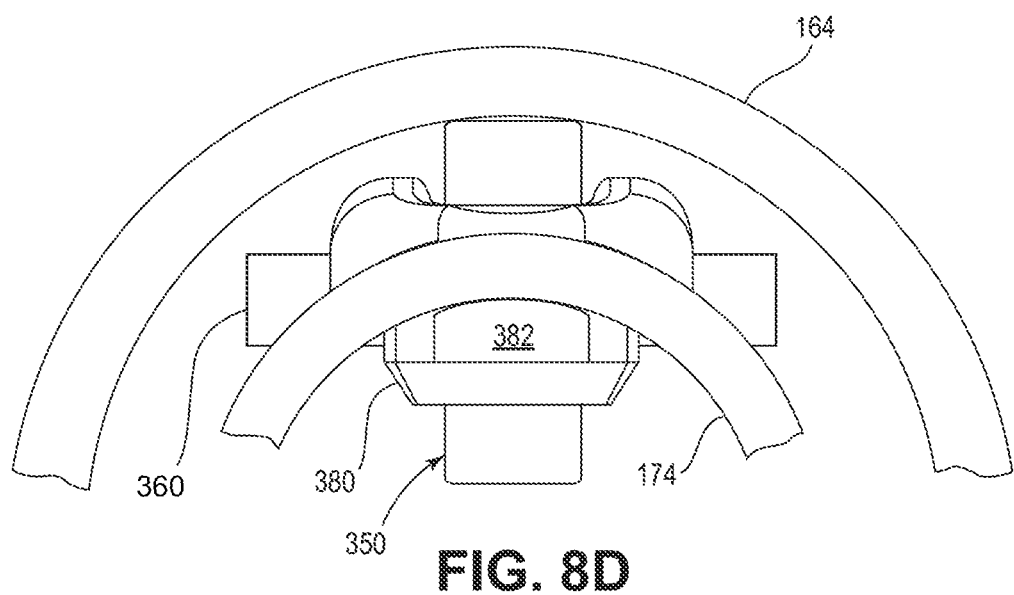
FIG. 8D is a partial end view of the assembly of FIG. 8B showing the bearing, the bearing shaft, the bearing cap, the lower arm body, and the upper arm body of the roll-up tarp apparatus of FIG. 1.

FIG. 8D is a partial end view of the assembly, and shows the bearing cap 380 with bearing cap tab 382 holding the bearing 350 on the bearing shaft 360 to the lower arm body 174, while the bearing 350 also rolls on the upper arm body 164 to provide a rolling bearing surface along the upper arm body as the lower portion 170 moves within the upper portion 160.

FIGS. 9A and 9B illustrate an alternative telescoping arm 152, similar to the telescoping arms 150a and 150b, but with the following chief differences. In this embodiment, the upper portion 160 has a lower end flange or narrowing 168 to reduce debris entrance into the telescoping arm 150; a sleeve and a stop and screws to retain the sleeve and the stop are not used in the telescoping arm 152. In this view, tension from the taut flexible tarp 130 applies force upward on the upper arm bracket 162, and spring 190 (not seen in this view but as previously described) applies a torque upon the lower arm bracket 172 in a counterclockwise direction. By this arrangement, upper bearing 350a and lower bearing 350b contact the inside surface of upper arm body 164, providing reduced frictional forces as the lower portion 170 slides within the upper portion 160. As best seen in FIG. 9B, the distance between the inside edge 169 of lower end flange 168 and the outer surface 175 is smaller than the distance between the inner surface 165 and the outer surface 175.

Figure 10A:
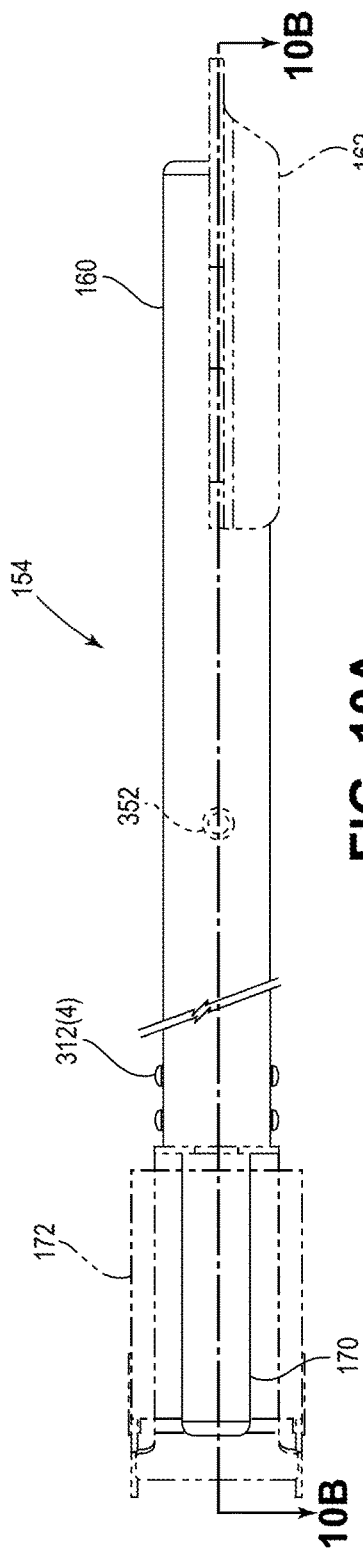
FIG. 10A is a top view of an alternative telescoping arm similar to that of FIG. 7E but incorporating an alternative bearing.
Figure 10B:
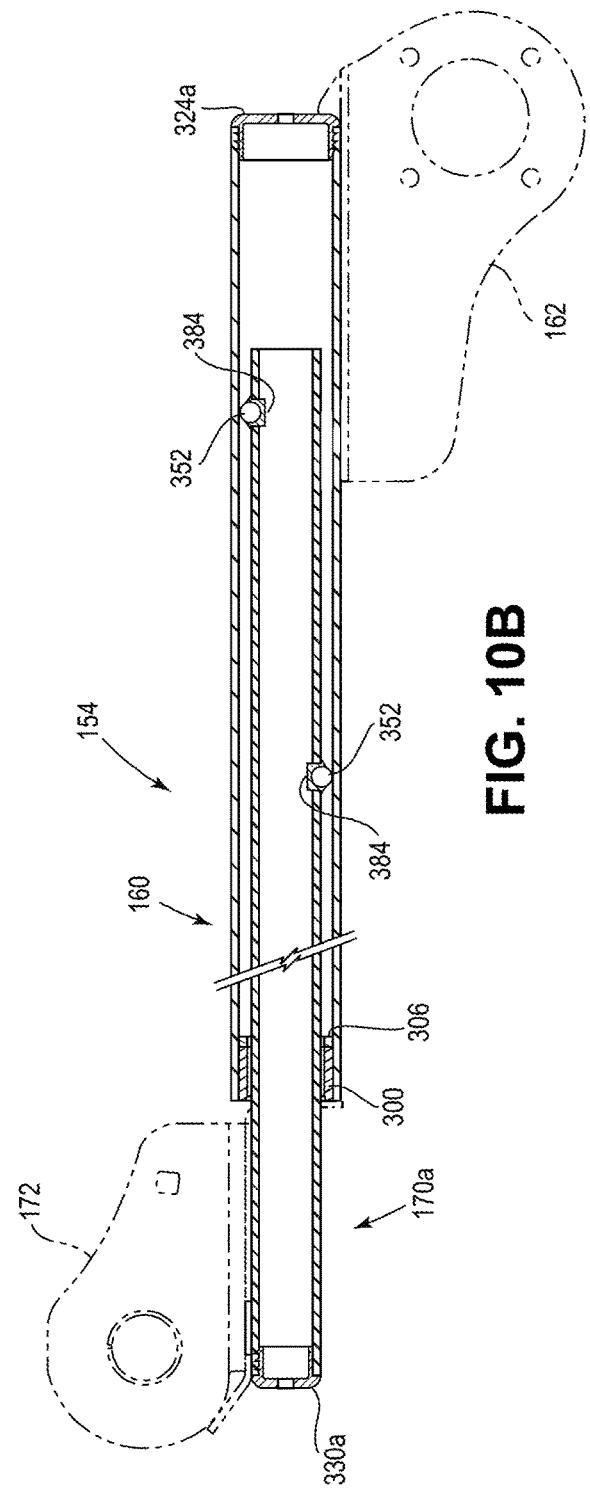
FIG. 10B is a longitudinal cross section of the alternative telescoping arm of FIG. 10A.

FIGS. 10A and 10B illustrate another alternative telescoping arm 154, similar to the telescoping arms 150a and 150b, but with the following chief differences. In this embodiment, alternative bearings are utilized, which are single-ball bearings 352, and corresponding bearing retainers 384 are press-fit into holes in the lower portion 170a to hold the single-ball bearings 352 in place. In this view, tension from the taut flexible tarp 130 applies force downward on the upper arm bracket 162, and spring 190 (not seen in this view but as previously described) applies a torque upon the lower arm bracket 172 in a counterclockwise direction. By this arrangement, bearings 352 contact the inside surface of upper arm body 164, providing reduced frictional forces as the lower portion 170a slides within the upper portion 160.

Figure 11C:
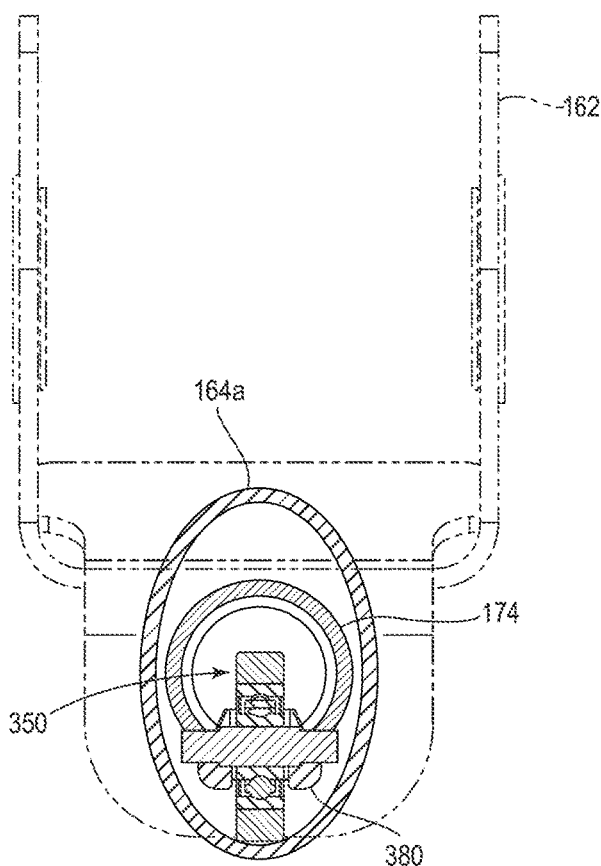
FIG. 11C is a transverse cross section of the alternative telescoping arm of FIG. 11A.

FIGS. 11A-11C illustrate another alternative telescoping arm 156, similar to the telescoping arms 150a and 150b, but with the following chief differences. In this configuration, a sleeve, a stop, and screws are not used. Also, an upper cap is not shown, but an upper cap could be used if desired to reduce debris entrance into the telescoping arm 156. In this view, tension from the taut flexible tarp 130 applies force downward on the upper arm bracket 162, and the spring 190 (not seen in this view but as previously described) applies a torque upon the lower arm bracket 172 in a counterclockwise direction. By this arrangement, the bearings 354 contact the inside surface of the upper arm body 164a, providing reduced frictional forces as the lower portion 170 slides within the upper portion 160a. FIG. 11C is a cross section through the telescoping arm 156 as indicated in FIG. 11A. As can be seen in FIG. 11C, the upper portion 160a includes an upper arm body 164a which is generally elliptical or oval, rather than round as in the upper arm body 164 of FIG. 7C, for example. Since the lower arm body 174 is the same as that shown in FIGS. 7A-7G, for example, the same bearings 350 and bearing caps 380 can be used.

Figure 12C:
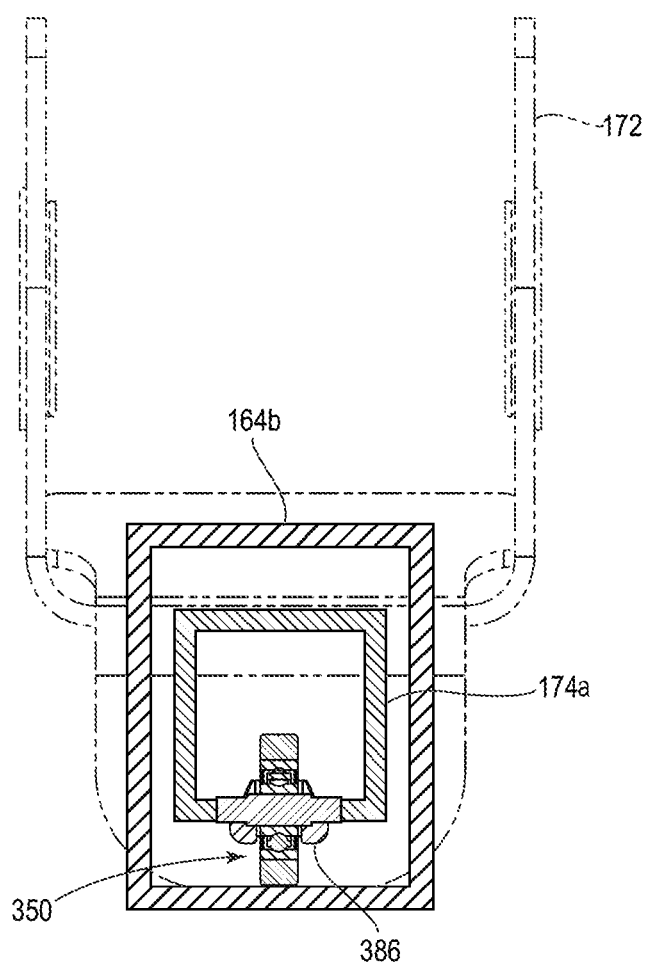
FIG. 12C is a transverse cross section of the alternative telescoping arm of FIG. 12A.

FIGS. 12A-12C illustrate another alternative telescoping arm 158, similar to the telescoping arms 150a and 150b, but with the following chief differences. In this example, the lower portion 170b has a lower arm body 174a which is rectangular in cross section, and the upper portion 160b has an upper arm body 164b which is rectangular (FIG. 12C). In this embodiment, alternative bearings are utilized, which are roller bearings 354, and corresponding bearing caps 386 are configured and arranged to secure the roller bearings 354 to the lower arm body 174a of lower portion 160b of telescoping arm 158. In this example, a sleeve, a stop, and screws are not used. In this view, an upper cap is not shown, but an upper cap could be used if desired to reduce debris entrance into the telescoping arm 158. In this view, tension from the taut flexible tarp 130 applies force downward on the upper arm bracket 162, and the spring 190 (not seen in this view but as previously described) applies a torque upon the lower arm bracket 172 in a counterclockwise direction. By this arrangement, the roller bearings 354 contact the inside surface of the upper arm body 164b, providing reduced frictional forces as the lower portion 170b slides within the upper portion 160b. FIG. 12C is a cross section through the telescoping arm 158 as indicated in FIG. 12A. As can be seen in FIG. 12C, the upper portion 160b includes an upper arm body 164b which is rectangular, rather than round as in the upper arm body 164 of FIG. 7C, for example. In addition, the lower portion 170b has a lower arm body 174a which is rectangular. Bearing caps 386 are configured and arranged to secure roller bearings 354 to lower arm body 170a.

FIGS. 13A-13C illustrate an alternative bearing device 390 which can be used in place of the various bearings 350a, 350b, 352, 354 or bearing assemblies 394 previously described. In general, the bearing device 390 includes a bearing surface 392', and can be used in place of the upper bearing or the lower bearing of the various telescoping arms of FIGS. 1-12. FIG. 13A is a perspective view of the bearing device 390, showing the bearing surface 392'. One of two bearing tabs or extensions 391 can be seen. FIG. 13B is a front view of the bearing device 390. The bearing tabs 391 are shown. The bearing device 390 is partially inserted into a bearing slot in the lower arm body in a similar manner as the bearing cap 380 is inserted into the bearing slot in the lower arm body as previously described, with the bearing tabs 391 snapped into place in the inside of the lower arm body to keep the assembly together.

The bearing device 390 is constructed of an engineering polymer such as high density polyethylene (HDPE), ultra high molecular weight polyethylene (UHMWPE), or a polyoxymethylene (POM) or acetal such as Delrin®, for example, chosen for durability and lubricity. The bearing device 390 can be fabricated by molding, additive process, or machining. Preferably, the bearing device 390 is fabricated by injection molding or 3-D printing. The bearing cap 380 is constructed of an engineering polymer also, such as those just listed for the bearing device 390, and can be fabricated in a manner similar to those just listed for the bearing device 390. However, since the bearing cap 380 holds a bearing (350, 350a, 350b, and others described herein) in position but does not actually bear on the inner surface 164, material lubricity is less important for the bearing cap 380 than for the bearing device 390.

The lower arm body 174 is fabricated from a metal, such as stainless steel, aluminum, galvanized or painted steel, or other metals or alloys. Preferably, the lower arm body 174 is fabricated from stainless steel, such as 304 stainless steel. The lower arm body 174 can be fabricated from the materials listed below for the upper arm body 164, but the lower arm body and the upper arm body need not be fabricated from the same material.

The upper arm body 164 is fabricated from a metal, such as stainless steel, aluminum, anodized aluminum, galvanized or plated steel, or other metals or alloys. The bearing surface 392, 392' bears on the inner surface 165 of the upper arm body 164, so the material of the upper arm body 164 is chosen with wear resistance in mind. Preferably, the upper arm body 164 is fabricated from a 304 or 316 series stainless steel, or a tempered aluminum such as grade 6061, 6063, or 6105 aluminum, or hard-coat anodized aluminum. More preferably, the upper arm body 164 is fabricated from 6061-T6 aluminum. The wear resistance of the upper arm body 164 is more important when using a sliding bearing such as the bearing device 390 than when using a rolling bearing such as bearing 350, 350a, 350b, 352, 354.

Figure 14:
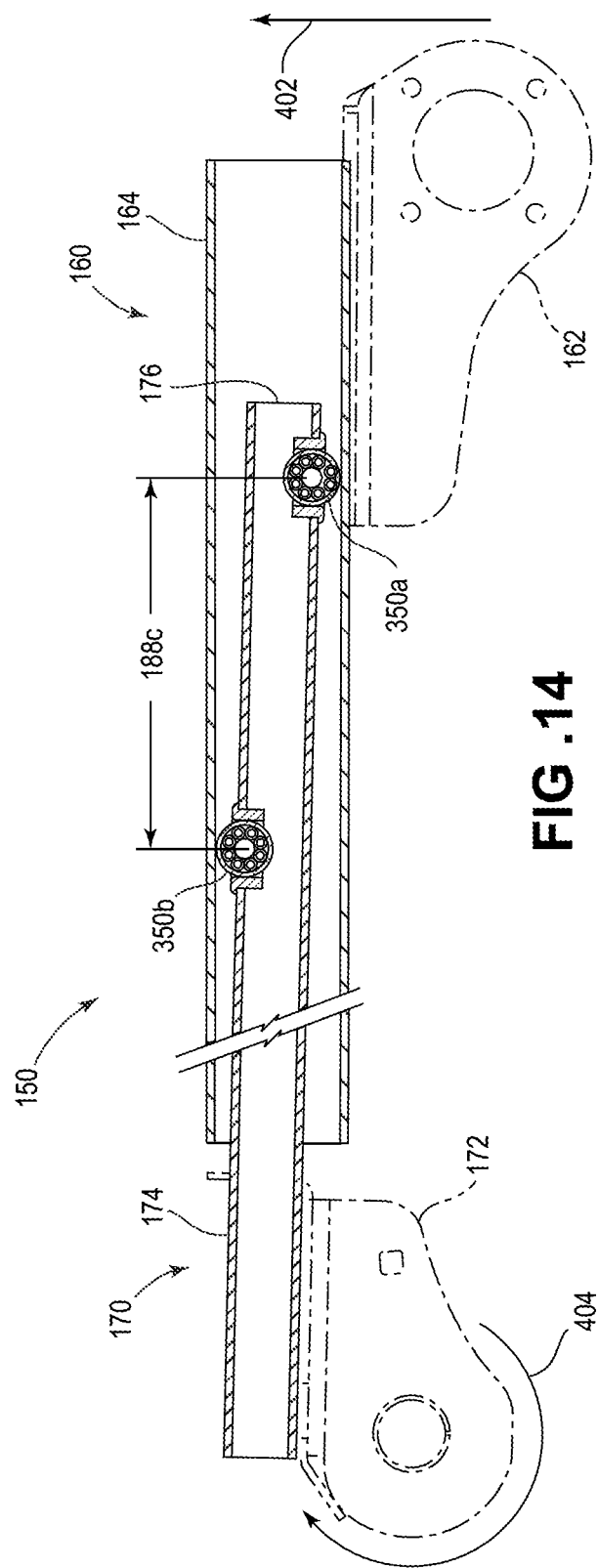
FIG. 14 is a schematic illustration of the telescoping arm of FIG. 7A showing potential canting of the lower portion within the upper portion, and indicating forces applied to the telescoping arm, and illustrating the position of the upper bearing and the lower bearing 350b.

FIG. 14 schematically illustrates telescoping arm 150a to show lower portion 170 skewed or canted within upper portion 160. In this view, tension from the taut flexible tarp 130 applies force upward on the upper arm bracket 162 as indicated by arrow 402. Spring 190 (not seen in this view but as previously described) applies a torque upon the lower arm bracket 172 in a clockwise direction as indicated by arrow 404. The balance of forces on the upper portion 160 and the lower portion 170 tends to tilt or cant the lower portion 170 within the upper portion 160 as illustrated in FIG. 14. By positioning the upper bearing 350a and the lower bearing 350b as shown, with a distance 188c between them, the bearings will counter the canting and help to keep the upper end 176 of the lower arm body 174 from scraping along the inside of the upper arm body 164 during use.

In various embodiments shown herein, the bearing device 390 is a bearing assembly 394 which includes bearings 350a, 350b, 352, 354, each of which includes a bearing surface 392. The bearing assembly 394 may include bearing caps 380, 386, bearing retainer 384, or shaft 360 where appropriate. In other cases, the bearing device includes a bearing surface 392, but may not require a bearing retainer 384 or a shaft 360; the bearing device 390 of FIG. 14, for example, does not require a bearing assembly including a bearing retainer and a shaft. Any bearing device 390, as used and described herein, includes a bearing surface 392 which is constructed and arranged so that the inner surface 165 of the upper arm body 164 contacts the bearing surface 392, and contact between the inner surface 165 and portions of the lower arm 170, 170a, 170b other than the bearing surface(s) 392 is minimized. The bearing surface 392 rolls or slides on the inner surface 165 of the upper arm body 164.

The various embodiments of telescoping arms shown herein each have two bearing devices 390, constructed and arranged so that the bearing surface 392 of the two bearing devices 390 bear on opposite sides of the inner surface 165 of the upper arm body 164; in other words, the two bearing surfaces are approximately 180 degrees apart. The two bearing surfaces 392 are also separated longitudinally from each other by a distance 188c, with the upper bearing 350a (or other bearing device described herein) being positioned closer to the upper end 176 of the lower arm body 174 than the lower bearing 350b is. In addition, the bearing surface 392 of the upper bearing 350a (or other bearing device described herein) is located in the direction towards which the upper end 176 of the lower arm body 174 is urged by the application of tension and torque (see FIG. 14), with the bearing surface 392 of the lower bearing 350b (or other bearing device described herein) is located on the opposite side, approximately 180 degrees apart; in this way, the two bearing surfaces 392 provide the bearing contact between the upper portion 160 and the lower portion 170, providing reduced friction and wear and other benefits when the lower 170 portion slides within the upper portion 160.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims. It is to be understood that even though numerous characteristics and advantages of the present invention have been set forth in the foregoing description, together with details of the structure and function of the invention, changes may be made in detail, especially in matters of shape, size and arrangement of parts within the principles of the invention to the full extent indicated by the broad general meaning of the terms in which the appended claims are expressed.

What is claimed is:

1. A roll-up tarp apparatus for attachment to an open top truck trailer, the open top truck trailer having a truck box and the truck box having a top opening, the top opening being at least partially defined by two ends and first and second longitudinal sides; the roll-up tarp apparatus comprising:
   a flexible tarp; wherein the tarp can be interconnected to the truck box;
   an elongated roll bar; and
   a telescoping arm that can interconnect the elongated roll bar to the truck box so that the elongated roll bar can roll as it moves over the top opening so that the tarp can be wound around or unwound from the elongated roll bar when the tarp is interconnected with the roll bar;
   wherein the telescoping arm has a first portion and a second portion; the second portion having an inner surface, the inner surface at least partially defining a generally hollow interior; the first portion having an outer surface; wherein the first portion can slide at least partially into and at least partially within the generally hollow interior of the second portion; the first portion including first and second bearing devices incorporated into the first portion proximate the outer surface in such a manner that permits each of the respective bearing devices to engage the inner surface of the second portion when the first portion is engaged within the generally hollow interior; wherein each of the respective first and second bearing devices include a bearing surface; wherein the bearing surfaces of the first and second bearing devices roll on the inner surface of the second portion when the first portion is engaged within the generally hollow interior of the second portion and the bearing surfaces are engaged with the inner surface.

2. The roll-up tarp apparatus of claim 1, wherein each of the respective bearing devices are bearing assemblies including a bearing having a bearing surface that engages the inner surface of the second portion when the first portion is engaged within the generally hollow interior of the second portion; wherein the inner surface has first and second sides and the first side is opposite from the second side; wherein the bearing surface of the first bearing device engages the first side of the inner surface of the second portion in a first position that is approximately 180 degrees from a second position where the bearing surface of the second bearing device engages the second side of the inner surface.

3. The roll-up tarp apparatus of claim 2, wherein the first portion includes first and second openings in the outer surface for receiving the respective bearing assemblies; wherein the clip of each of the respective bearing assemblies can be engaged at least partially within one of the respective openings to hold the respective bearing in place at least partially within the respective opening.

4. The roll-up tarp apparatus of claim 3, wherein each of the respective clips of the respective bearing assembly includes first and second extensions, wherein the respective extensions can be engaged at least partially within the respective opening in the first portion so as to retain the bearing at least partially within the respective opening.

5. The roll-up tarp apparatus of claim 1, wherein each of the respective bearing devices are bearing assemblies; and each of the respective bearing assemblies includes a bearing clip; wherein the bearing clip can be engaged with the first portion proximate an opening in the outer surface of the first portion to hold the bearing at least partially within the opening.

6. The roll-up tarp apparatus of claim 1, wherein the respective bearing devices are bearing assemblies; the respective bearing assemblies including a bearing clip; wherein the bearing can be engaged with the first portion when positioned at least partially within an opening in the outer surface of the first portion and the bearing clip can be engaged with the first portion proximate the opening in the outer surface of the first portion to hold the bearing at least partially within the opening.

7. The roll-up tarp apparatus of claim 6, wherein each of the respective bearings have a shaft about which the bearing surface can rotate, wherein the shaft is engaged with the first portion when it resides at least partially within the opening and the bearing clip is engaged with the first portion proximate the opening to hold the bearing at least partially within the opening.

8. The roll-up tarp apparatus of claim 6, wherein each bearing assembly includes a clip and a bearing and the first portion includes first and second openings in the outer surface for receiving the first and second bearing assemblies, respectively; the clip having first and second extensions that engage the first portion when the respective bearing assembly is seated within the respective opening so as to hold the bearing within the respective opening.

9. The roll-up tarp apparatus of claim 8, wherein each bearing includes a shaft about which the bearing surface can rotate when the bearing is seated within the respective opening.

10. The roll-up tarp apparatus of claim 1, wherein the second portion has an inner sleeve proximate a first end of the second portion, wherein the inner sleeve has an inside surface; and wherein a first distance between the inner surface and the outer surface, when the first portion is engaged within the second portion, is greater than a second distance between the inside surface and the outer surface when the first portion is engaged within the second portion and the first portion passes through the sleeve.

11. The roll-up tarp apparatus of claim 1, wherein the second portion has a narrowing proximate a first end of the second portion; wherein a first distance between the inner surface and the outer surface when the first portion is engaged within the second portion, is greater than a second distance between an edge of the narrowing and the outer surface when the first portion is engaged within the second portion and the first portion passes through the narrowing.

12. The roll-up tarp apparatus of claim 1, wherein the second portion has an inner sleeve and a retaining collar proximate a first end of the second portion, wherein the inner sleeve has an inside surface; and wherein a first distance between the inner surface and the outer surface when the first portion is engaged within the second portion, is greater than a second distance between the inside surface and the outer surface when the first portion is engaged within the second portion and the first portion passes through the sleeve and the retaining collar.

13. The roll-up tarp apparatus of claim 1, wherein the second portion has an inner sleeve and a retaining collar proximate a first end of the second portion, wherein the inner sleeve has an inside surface; and wherein a first distance between the inner surface and the outer surface when the first portion is engaged within the second portion, is greater than a second distance between the inside surface and the outer surface when the first portion is engaged within the second portion and the first portion passes through the sleeve and the retaining collar; and wherein the second portion has a narrowing proximate the first end; wherein a first distance between the inner surface and the outer surface when the first portion is engaged within the second portion, is greater than a second distance between an edge of the narrowing and the outer surface when the first portion is engaged within the second portion and the first portion passes through the narrowing.

14. A roll-up tarp apparatus for attachment to an open top truck trailer, the open top truck trailer having a truck box and the truck box having a top opening, the top opening being at least partially defined by two ends and first and second longitudinal sides; the roll-up tarp apparatus comprising:
  a flexible tarp, the tarp having first and second lateral edges and first and second longitudinal edges; wherein the first longitudinal edge can be interconnected to the first longitudinal side of the truck box;
  an elongated roll bar attached to the second longitudinal edge of the tarp; the elongated roll bar having first and second ends; wherein the tarp can be wound around the elongated roll bar; and
  a telescoping arm that can interconnect the elongated roll bar to the truck box so that the elongated roll bar can move over the top opening as the tarp is wound around the elongated roll bar;
  wherein the telescoping arm has a first portion and a second portion; the second portion having an inner surface, the inner surface at least partially defining a generally hollow interior; and the first portion having an outer surface; wherein first and second bearing devices are incorporated into the first portion proximate the outer surface in such a manner that permits each of the respective bearing devices to engage the inner surface of the second portion when the first portion is engaged within the generally hollow interior; wherein each of the respective bearing devices have a bearing surface which will be engaged with opposite sides of the inner surface of the second portion in first and second positions that are separated longitudinally from one another with respect to the length of the first portion when the first portion is engaged within the generally hollow interior of the second portion.

15. The roll-up tarp apparatus of claim 14, wherein the bearing surface of the first bearing device engages the inner surface of the second portion in a first position that is approximately 180 degrees from a second position where the bearing surface of the second bearing device engages the second side of the inner surface.

16. The roll-up tarp apparatus of claim 14, wherein each of the respective bearing devices are bearing assemblies.

17. The roll-up tarp apparatus of claim 16, wherein the first portion includes a separate opening in the outer surface for receiving each of the respective bearing assemblies; wherein the clip of each of the respective bearing assemblies can be engaged at least partially within either the first or second opening.

18. The roll-up tarp apparatus of claim 17, wherein each of the respective clips the respective bearing assembly includes first and second extensions, wherein the respective extensions can be engaged at least partially within the respective opening in the first portion so as to retain the bearing at least partially within the respective opening.

19. The roll-up tarp apparatus of claim 14, wherein each of the respective bearing devices are bearing assemblies; and each of the respective bearing assemblies includes a bearing clip; wherein the bearing clip can be engaged with the first portion proximate an opening in the outer surface of the first portion to hold the bearing at least partially within the opening.

20. The roll-up tarp apparatus of claim 19, wherein each bearing includes a shaft about which the bearing surface can rotate with respect to the clip.

21. The roll-up tarp apparatus of claim 14, wherein the second portion has a first end and the first end includes a narrowing; wherein a first distance between the inner surface and the outer surface, when the first portion is engaged within the second portion, is greater than a second distance between an edge of the narrowing and the outer surface when the first portion is engaged within the second portion and the first portion passes through the narrowing.

22. The roll-up tarp apparatus of claim 14, wherein the second portion has an inner sleeve proximate a first end of the second portion, wherein the inner sleeve has an inside surface; and wherein a first distance between the inner surface and the outer surface, when the first portion is engaged within the second portion, is greater than a second distance between the inside surface and the outer surface when the first portion is engaged within the second portion and the first portion passes through the sleeve.

23. The roll-up tarp apparatus of claim 14, wherein the second portion includes a retaining collar proximate the inner surface arranged and configured to restrict movement of a bearing residing at least partially within the outer surface of the first portion, when the first portion is engaged within the second portion, so as to limit the movement of the bearing along the inner surface of the second portion when the first portion is engaged within the second portion.

24. The roll-up tarp apparatus of claim 14, wherein the second portion has an inner sleeve and a retaining collar proximate a first end of the second portion, wherein the inner sleeve has an inside surface; and wherein a first distance between the inner surface and the outer surface, when the first portion is engaged within the second portion, is greater than a second distance between the inside surface and the outer surface when the first portion is engaged within the second portion and the first portion passes through the sleeve and the retaining collar.

25. A roll-up tarp apparatus for attachment to an open top truck trailer, the open top truck trailer having a truck box and the truck box having a top opening, the top opening being at least partially defined by two ends and first and second longitudinal sides; the roll-up tarp apparatus comprising:
a flexible tarp, the tarp having first and second lateral edges and first and second longitudinal edges; wherein the first longitudinal edge can be interconnected to the first longitudinal side of the truck box;
an elongated roll bar attached to the second longitudinal edge of the tarp; the elongated roll bar having first and second ends; wherein the tarp can be wound around the elongated roll bar; and
a telescoping arm that can interconnect the elongated roll bar to the truck box so that the elongated roll bar can move over the top opening as the tarp is wound around the elongated roll bar;
wherein the telescoping arm has a first portion and a second portion; the second portion having an inner surface, the inner surface at least partially defining a generally hollow interior; and the first portion having an outer surface; wherein first and second bearing devices are incorporated into the first portion proximate the outer surface in such a manner that permits each of the respective bearing devices to engage the inner surface of the second portion when the first portion is engaged within the generally hollow interior; the second portion having a first end and the first end including a narrowing; wherein each of the respective bearing devices have a bearing surface which will be engaged with opposite sides of the inner surface of the second portion in first and second positions that are separated longitudinally from one another with respect to the length of the first portion when the first portion is engaged within the generally hollow interior of the second portion such that first bearing device will be closer than the second bearing device to the first end; wherein a first distance between the inner surface and the outer surface, when the first portion is engaged within the second portion, is greater than a second distance between an edge of the narrowing and the outer surface when the first portion is engaged within the second portion and the first portion passes through the narrowing.

26. The roll-up tarp apparatus of claim 25, wherein each of the respective bearing devices are bearing assemblies.

27. The roll-up tarp apparatus of claim 26, wherein the first portion includes a separate opening in the outer surface for receiving each of the respective bearing assemblies; wherein the clip of each of the respective bearing assemblies can be engaged at least partially within either the first or second opening.

28. The roll-up tarp apparatus of claim 27, wherein each of the respective clips of the respective bearing assembly includes first and second extensions, wherein the respective extensions can be engaged at least partially within the respective opening in the first portion so as to retain the bearing at least partially within the respective opening.

29. The roll-up tarp apparatus of claim 25, wherein each of the respective bearing devices are bearing assemblies; and each of the respective bearing assemblies includes a bearing clip; wherein the bearing clip can be engaged with the first portion proximate an opening in the outer surface of the first portion to hold the bearing at least partially within the opening; and wherein each bearing includes a shaft about which the bearing surface can rotate with respect to the clip.

30. The roll-up tarp apparatus of claim 25, wherein the second portion has an inner sleeve proximate a first end of the second portion, wherein the inner sleeve has an inside surface; and wherein a first distance between the inner surface and the outer surface, when the first portion is engaged within the second portion, is greater than a second distance between the inside surface and the outer surface when the first portion is engaged within the second portion and the first portion passes through the sleeve.

31. The roll-up tarp apparatus of claim 25, wherein the second portion includes a retaining collar proximate the inner surface arranged and configured to restrict movement of a bearing residing at least partially within the outer surface of the first portion, when the first portion is engaged within the second portion, so as to limit the movement of the bearing along the inner surface of the second portion when the first portion is engaged within the second portion.

32. The roll-up tarp apparatus of claim 25, wherein the second portion has an inner sleeve and a retaining collar proximate a first end of the second portion, wherein the inner sleeve has an inside surface; and wherein a first distance between the inner surface and the outer surface, when the first portion is engaged within the second portion, is greater than a second distance between the inside surface and the outer surface when the first portion is engaged within the second portion and the first portion passes through the sleeve and the retaining collar.

33. A roll-up tarp apparatus for attachment to an open top truck trailer, the open top truck trailer having a truck box and the truck box having a top opening, the top opening being at least partially defined by two ends and first and second longitudinal sides; the roll-up tarp apparatus comprising:
- a flexible tarp, the tarp having first and second lateral edges and first and second longitudinal edges; wherein the first longitudinal edge can be interconnected to the first longitudinal side of the truck box;
- an elongated roll bar attached to the second longitudinal edge of the tarp; the elongated roll bar having first and second ends; wherein the tarp can be wound around the elongated roll bar; and
- a telescoping arm that can interconnect the elongated roll bar to the truck box so that the elongated roll bar can move over the top opening as the tarp is wound around the elongated roll bar;
- wherein the telescoping arm has a first portion and a second portion; the second portion having an inner surface, the inner surface at least partially defining a generally hollow interior; and the first portion having an outer surface; wherein first and second bearing devices are incorporated into the first portion proximate the outer surface in such a manner that permits each of the respective bearing devices to engage the inner surface of the second portion when the first portion is engaged within the generally hollow interior; wherein the second portion has an inner sleeve proximate a first end of the second portion, wherein the inner sleeve has an inside surface; and wherein a first distance between the inner surface and the outer surface, when the first portion is engaged within the second portion, is greater than a second distance between the inside surface and the outer surface when the first portion is engaged within the second portion and the first portion passes through the sleeve.

34. The roll-up tarp apparatus of claim 33, wherein the first and second bearing devices each include a bearing surface; wherein the bearing surface of the first bearing device engages the inner surface of the second portion on a side of the inner surface opposite to the side of the inner surface that is engaged by the bearing surface of the second bearing device.

35. The roll-up tarp apparatus of claim 33, wherein each of the respective bearing devices are bearing assemblies including a bearing having a bearing surface that engages the inner surface of the second portion when the first portion is engaged within the generally hollow interior of the second portion.

36. The roll-up tarp apparatus of claim 35, wherein the first portion includes a separate opening in the outer surface for receiving each of the respective bearing assemblies; wherein the clip of each of the respective bearing assemblies can be engaged at least partially within either the first or second opening.

37. The roll-up tarp apparatus of claim 36, wherein each of the respective clips of the respective bearing assembly includes first and second extensions, wherein the respective extensions can be engaged at least partially within the respective opening in the first portion so as to retain the bearing at least partially within the respective opening.

38. The roll-up tarp apparatus of claim 33, wherein each of the respective bearing devices are bearing assemblies; and each of the respective bearing assemblies includes a bearing clip and a bearing having a bearing surface that engages the inner surface of the second portion when the first portion is engaged within the generally hollow interior of the second portion; wherein the bearing clip can be engaged with the first portion proximate an opening in the outer surface of the first portion to hold the bearing at least partially within the opening.

39. The roll-up tarp apparatus of claim 38, wherein each bearing includes a shaft about which the bearing surface can rotate with respect to the clip.

40. The roll-up tarp apparatus of claim 33, wherein the second portion has a first end and the first end includes a narrowing; wherein a first distance between the inner surface and the outer surface, when the first portion is engaged within the second portion, is greater than a second distance between an edge of the narrowing and the outer surface when the first portion is engaged within the second portion and the first portion passes through the narrowing.

41. The roll-up tarp apparatus of claim 33, wherein the second portion includes a retaining collar proximate the inner surface arranged and configured to restrict movement of a bearing residing at least partially within the outer surface of the first portion, when the first portion is engaged within the second portion, so as to limit the movement of the bearing along the inner surface of the second portion when the first portion is engaged within the second portion.

42. The roll-up tarp apparatus of claim 33, wherein the second portion has a retaining collar proximate the first end of the second portion.

43. A roll-up tarp apparatus for attachment to an open top truck trailer, the open top truck trailer having a truck box and the truck box having a top opening, the top opening being at least partially defined by two ends and first and second longitudinal sides; the roll-up tarp apparatus comprising:
- a flexible tarp, the tarp having first and second lateral edges and first and second longitudinal edges; wherein the first longitudinal edge can be interconnected to the first longitudinal side of the truck box;
- an elongated roll bar attached to the second longitudinal edge of the tarp; the elongated roll bar having first and second ends; wherein the tarp can be wound around the elongated roll bar; and
- a telescoping arm that can interconnect the elongated roll bar to the truck box so that the elongated roll bar can move over the top opening as the tarp is wound around the elongated roll bar;
- wherein the telescoping arm has a first portion and a second portion; the second portion having an inner surface, the inner surface at least partially defining a generally hollow interior; and the first portion having an outer surface; wherein first and second bearing devices are incorporated into the first portion proximate the outer surface in such a manner that permits each of the respective bearing devices to engage the inner surface of the second portion when the first portion is engaged within the generally hollow interior; wherein the second portion includes a retaining collar proximate the inner surface arranged and configured to restrict movement of a bearing residing at least partially within the outer surface of the first portion, when the first portion is engaged within the second portion, so as to limit the movement of the bearing along the inner surface of the second portion when the first portion is engaged within the second portion.

44. The roll-up tarp apparatus of claim 43, wherein the first and second bearing devices each include a bearing surface; wherein the bearing surface of the first bearing device engages the inner surface of the second portion on a side of the inner surface opposite to the side of the inner surface that is engaged by the bearing surface of the second bearing device.

45. The roll-up tarp apparatus of claim 43, wherein each of the respective bearing devices are bearing assemblies including a bearing having a bearing surface that engages the inner surface of the second portion when the first portion is engaged within the generally hollow interior of the second portion.

46. The roll-up tarp apparatus of claim 43, wherein each of the respective bearing devices are bearing assemblies; and each of the respective bearing assemblies includes a bearing clip and a bearing having a bearing surface that engages the inner surface of the second portion when the first portion is engaged within the generally hollow interior of the second portion; wherein the bearing clip can be engaged with the first portion proximate an opening in the outer surface of the first portion to hold the bearing at least partially within the opening.

47. The roll-up tarp apparatus of claim 46, wherein each bearing includes a shaft about which the bearing surface can rotate with respect to the clip.

48. The roll-up tarp apparatus of claim 46, wherein the first portion includes a separate opening in the outer surface for receiving each of the respective bearing assemblies; wherein the clip of each of the respective bearing assemblies can be engaged at least partially within either the first or second opening.

49. The roll-up tarp apparatus of claim 48, wherein each of the respective clips of the respective bearing assembly includes first and second extensions, wherein the respective extensions can be engaged at least partially within the respective opening in the first portion so as to retain the bearing at least partially within the respective opening.

50. The roll-up tarp apparatus of claim 43, wherein the second portion has a first end and the first end includes a narrowing; wherein a first distance between the inner surface and the outer surface, when the first portion is engaged within the second portion, is greater than a second distance between an edge of the narrowing and the outer surface when the first portion is engaged within the second portion and the first portion passes through the narrowing.

51. The roll-up tarp apparatus of claim 43, wherein the second portion has an inner sleeve proximate a first end of the second portion, wherein the inner sleeve has an inside surface; and wherein a first distance between the inner surface and the outer surface, when the first portion is engaged within the second portion, is greater than a second distance between the inside surface and the outer surface when the first portion is engaged within the second portion and the first portion passes through the sleeve.

52. A roll-up tarp apparatus for attachment to an open top truck trailer, the open top truck trailer having a truck box and the truck box having a top opening, the top opening being at least partially defined by two ends and first and second longitudinal sides; the roll-up tarp apparatus comprising:
a flexible tarp, the tarp having first and second lateral edges and first and second longitudinal edges; wherein the first longitudinal edge can be interconnected to the first longitudinal side of the truck box;
an elongated roll bar attached to the second longitudinal edge of the tarp; the elongated roll bar having first and second ends; wherein the tarp can be wound around the elongated roll bar; and
a telescoping arm that can interconnect the elongated roll bar to the truck box so that the elongated roll bar can move over the top opening as the tarp is wound around the elongated roll bar;
wherein the telescoping arm has a first portion and a second portion; the second portion having an inner surface, the inner surface at least partially defining a generally hollow interior; and the first portion having an outer surface; wherein first and second bearing devices are incorporated into the first portion proximate the outer surface in such a manner that permits each of the respective bearing devices to engage the inner surface of the second portion when the first portion is engaged within the generally hollow interior; wherein the second portion has an inner sleeve and a retaining collar proximate a first end of the second portion, wherein the inner sleeve has an inside surface; and wherein a first distance between the inner surface and the outer surface, when the first portion is engaged within the second portion, is greater than a second distance between the inside surface and the outer surface when the first portion is engaged within the second portion and the first portion passes through the sleeve and the retaining collar; and wherein the second portion has a narrowing proximate the first end; wherein a first distance between the inner surface and the outer surface, when the first portion is engaged within the second portion, is greater than a second distance between an edge of the narrowing and the outer surface when the first portion is engaged within the second portion and the first portion passes through the narrowing.

53. The roll-up tarp apparatus of claim 52, wherein the first and second bearing devices each include a bearing surface; wherein the bearing surface of the first bearing device engages the inner surface of the second portion on a side of the inner surface opposite to the side of the inner surface that is engaged by the bearing surface of the second bearing device.

54. The roll-up tarp apparatus of claim 52, wherein each of the respective bearing devices are bearing assemblies including a bearing having a bearing surface that engages the inner surface of the second portion when the first portion is engaged within the generally hollow interior of the second portion.

55. The roll-up tarp apparatus of claim 52, wherein each of the respective bearing devices are bearing assemblies; and each of the respective bearing assemblies includes a bearing clip and a bearing having a bearing surface that engages the inner surface of the second portion when the first portion is engaged within the generally hollow interior of the second portion; wherein the bearing clip can be engaged with the first portion proximate an opening in the outer surface of the first portion to hold the bearing at least partially within the opening.

56. The roll-up tarp apparatus of claim 55, wherein each bearing includes a shaft about which the bearing surface can rotate with respect to the clip.

57. The roll-up tarp apparatus of claim 52, wherein the first portion includes a separate opening in the outer surface for receiving each of the respective bearing devices; wherein the clip of each of the respective bearing devices can be engaged at least partially within either the first or second opening.

58. The roll-up tarp apparatus of claim 56, wherein each of the respective clips of the respective bearing assembly includes first and second extensions, wherein the respective extensions can be engaged at least partially within the respective opening in the first portion so as to retain the bearing at least partially within the respective opening.

59. A method of using a roll-up tarp apparatus, comprising the steps of:

1) providing a roll-up tarp apparatus for attachment to an open top truck trailer, the open top truck trailer having a truck box and the truck box having a top opening, the top opening being at least partially defined by two ends and first and second longitudinal sides; the roll-up tarp apparatus including:
   a) a flexible tarp; wherein the tarp can be interconnected to the truck box;
   b) an elongated roll bar; and
   c) a telescoping arm that can interconnect the elongated roll bar to the truck box so that the elongated roll bar can roll as it moves over the top opening so that the tarp can be wound around or unwound from the elongated roll bar when the tarp is interconnected with the roll bar; wherein the telescoping arm has a first portion and a second portion; the second portion having an inner surface, the inner surface at least partially defining a generally hollow interior; the first portion having an outer surface;
   wherein the first portion can slide at least partially into and at least partially within the generally hollow interior of the second portion; the first portion including first and second bearing devices incorporated into the first portion proximate the outer surface in such a manner that permits each of the respective bearing devices to engage the inner surface of the second portion when the first portion is engaged within the generally hollow interior; wherein each of the respective first and second bearing devices include a bearing surface; wherein the bearing surface of the first bearing device engages the inner surface of the second portion on a side of the inner surface opposite to the side of the inner surface that is engaged by the bearing surface of the second bearing device; the second portion having a first end and the first end including a narrowing; wherein each of the respective bearing devices have a bearing surface which will be engaged with opposite sides of the inner surface of the second portion in first and second positions that are separated longitudinally from one another with respect to the length of the first portion when the first portion is engaged within the generally hollow interior of the second portion such that first bearing device will be closer than the second bearing device to the first end; wherein a first distance between the inner surface and the outer surface, when the first portion is engaged within the second portion, is greater than a second distance between an edge of the narrowing and the outer surface when the first portion is engaged within the second portion and the first portion passes through the narrowing; and
2) attaching the roll-up tarp apparatus to an open top truck trailer.

60. The method of claim 59, wherein the roll-up tarp apparatus includes two telescoping arms; wherein the respective telescoping arms are positioned on the truck trailer in the manner selected from the group consisting of: 1) one on the front of the trailer and one on the back of the trailer; and 2) one on one side of the trailer and one on the opposite side of the trailer.

61. The method of claim 59, wherein the respective bearing devices are bearing assemblies.

62. The method of claim 61, wherein the bearing assemblies include a bearing clip; wherein the bearing clip can be engaged with the first portion proximate an opening in the outer surface of the first portion to hold the bearing at least partially within the opening.

63. The method of claim 61, wherein the bearing assemblies include a bearing clip; wherein the bearing can be engaged with the first portion when positioned at least partially within an opening in the outer surface of the first portion and the bearing clip can be engaged with the first portion proximate the opening in the outer surface of the first portion to hold the bearing at least partially within the opening; wherein each of the respective bearings have a shaft about which the bearing surface can rotate, wherein the shaft is engaged with the first portion when it resides at least partially within the opening and the bearing clip is engaged with the first portion proximate the opening to hold the bearing at least partially within the opening.

64. The method of claim 63, wherein the second portion has an inner sleeve proximate a first end of the second portion, wherein the inner sleeve has an inside surface; and wherein a first distance between the inner surface and the outer surface, when the first portion is engaged within the second portion, is greater than a second distance between the inside surface and the outer surface when the first portion is engaged within the second portion and the first portion passes through the sleeve, wherein the second portion has a narrowing proximate a first end of the second portion; wherein a first distance between the inner surface and the outer surface when the first portion is engaged within the second portion, is greater than a second distance between an edge of the narrowing and the outer surface when the first portion is engaged within the second portion and the first portion passes through the narrowing.

65. The method of claim 64, wherein the second portion has an inner sleeve and a retaining collar proximate a first end of the second portion, wherein the inner sleeve has an inside surface; and wherein a first distance between the inner surface and the outer surface when the first portion is engaged within the second portion, is greater than a second distance between the inside surface and the outer surface when the first portion is engaged within the second portion and the first portion passes through the sleeve and the retaining collar; and wherein the second portion has a narrowing proximate the first end; wherein a first distance between the inner surface and the outer surface when the first portion is engaged within the second portion, is greater than a second distance between an edge of the narrowing and the outer surface when the first portion is engaged within the second portion and the first portion passes through the narrowing.

* * * * *